United States Patent [19]
Wood

[11] Patent Number: 5,417,110
[45] Date of Patent: May 23, 1995

[54] UNIT AND SYSTEM FOR SENSING FLUID VELOCITY

[76] Inventor: Tony J. Wood, 16277 Terracewood Dr., Eden Prairie, Minn. 55346

[21] Appl. No.: 706,795

[22] Filed: May 29, 1991

[51] Int. Cl.⁶ .................................................. G01F 1/68
[52] U.S. Cl. .................................. 73/204.16; 73/204.15
[58] Field of Search ........... 73/204.22, 204.25, 204.27, 73/204.15, 204.16, 118.2

[56] References Cited

U.S. PATENT DOCUMENTS

| | | |
|---|---|---|
| 3,199,348 | 8/1965 | Salera . |
| 3,400,582 | 9/1968 | Warner .................... 73/204.22 |
| 3,789,831 | 2/1974 | Kopaniky et al. ........... 73/204.16 |
| 3,800,592 | 4/1974 | Jones, Jr. .................. 73/204.16 |
| 3,945,252 | 3/1976 | Fiore ........................ 73/204.27 |
| 4,016,759 | 4/1977 | Baker et al. ............... 73/204.16 |
| 4,074,566 | 2/1978 | Obayashi et al. . |
| 4,245,502 | 1/1981 | Eiermann et al. . |
| 4,393,702 | 7/1983 | Kohama et al. ............ 73/204.27 |
| 4,445,369 | 5/1984 | Stoltman et al. . |
| 4,480,467 | 11/1984 | Harter et al. ............... 73/204.15 |
| 4,648,271 | 3/1987 | Woolf ........................ 73/204.15 |
| 4,805,452 | 2/1989 | Eiermann et al. . |
| 4,864,855 | 9/1989 | Shiraishi et al. . |
| 4,972,708 | 11/1990 | Wiegleb et al. ............. 73/204.22 |
| 4,986,122 | 1/1991 | Gust ........................... 73/204.15 |
| 5,119,674 | 6/1992 | Nielsen ....................... 73/204.24 |

FOREIGN PATENT DOCUMENTS

| | | |
|---|---|---|
| 1904029 | 8/1970 | Germany . |
| 2649040 | 5/1978 | Germany . |
| 2728060 | 1/1979 | Germany . |
| 347732 | 12/1989 | Germany . |
| 1098077 | 1/1968 | United Kingdom ............ 73/204.23 |
| 1488012 | 10/1977 | United Kingdom . |

OTHER PUBLICATIONS

Bryan K. Wolske. *Mass Flow Meters Come of Age*, Control 40 (Jan. 1990).

Primary Examiner—Herbert Goldstein
Assistant Examiner—R. Biegel
Attorney, Agent, or Firm—Merchant, Gould, Smith, Edell, Welter & Schmidt

[57] ABSTRACT

A unit and system for sensing fluid velocity which is particularly well suited for use in the control system of an HVAC unit. A salient feature of the system is the combination of heat generating structure, a plurality of thermally conductive elements, and thermal insulation between the heat generating structure and a fluid flow path. Each of the conductive elements is in thermal communication with the heat generating structure at one end and the fluid flow path at a second end. As a result, heat transfer to the fluid is channelled through the conductive elements. This achieves a distributed heat flow path which results in an efficient and accurate heat flow measurement.

1 Claim, 22 Drawing Sheets

UNIT AND SYSTEM FOR SENSING FLUID VELOCITY

BACKGROUND OF THE INVENTION

1. Field of the Invention

This invention generally pertains to the sensing of fluid flow, and specifically pertains to the sensing of the flow of a gas such as air in the duct work of a heating, ventilating and air conditioning system.

2. Description of the Prior Art

Air flow sensors are used in heating, ventilating, and air conditioning systems to measure and control the distribution of air within primary and secondary ducts that supply air for heating, cooling, or ventilating air conditioned zones within a building.

Several techniques have been used to sense air flow. One technique employs a pitoh tube mounted in the duct work with the pitoh tube connected to a differential pressure sensor. As air flows past the holes in the pitoh tube, a small differential pressure is created. Variations in air flow velocity change the differential pressure in the tube resulting in a change in the output transmitted by the differential pressure sensor. The pitoh tube can be constructed with an array of holes distributed along the tube to sample air velocity at several points within the duct. The distributed array of holes averages the air flow velocity across the duct, offering improved sensing over a single point measurement of air flow velocity. The problem with the pitoh tube and differential pressure sensor technique is that the differential pressures developed with the typical air flow velocity in HVAC systems are very small. Further, the relationship between air flow velocity and differential pressure is non-linear. The small pressures and non-linear relationship both operate to significantly decrease accuracy at low air flow velocities where air flow velocity control is most desired.

A second technique uses variations on a propeller or turbine wheel mounted in or connected in parallel to the air stream with some form of magnetic or optically coupled sensor to detect rotation of the propeller or turbine wheel. As the air moves past the propeller or turbine wheel, it turns on a bearing surface attached to fixed bearing mounts. As the air flow velocity increases or decreases, the propeller or turbine wheel rotates faster or slower respectively, and the connected sensor transmits an output proportional to the air flow velocity. The problem with this technique is that the bearing system and propeller or turbine wheel design limit the accuracy at low air flow velocity. The error becomes increasingly large as air flow velocity decreases toward the stall point, where rotational force on the prop or turbine wheel is less than the frictional forces of the bearing surface. Further, the bearing system will deteriorate in use, causing accuracy to degrade with time until ultimate failure of the moving parts occurs. Contaminants normally present in the air can exacerbate the rate of accuracy degradation in this type of system.

A third technique uses the hot wire anemometer principle. A small sensing element such as a wire is constructed from a material that exhibits the physical property of changing electrical resistance with changes in temperature. The sensing element is placed in the air stream and heated above the temperature of the air. As the air flows by, heat is transferred from the sensing element to the air, cooling the sensing element. Power is delivered to the sensing element to maintain a constant temperature. The amount of heat transferred to the air and the corresponding power delivered to the sensing element are related to the air flow velocity and sensing element surface area. The problem with this technique is that it is sensitive to air flow velocity only in the vicinity of the small sensing element. In heating, ventilating and air conditioning systems, the air flow velocity varies across the cross section of the duct due to duct design or duct installation practice. Therefore, if the sensor is installed in location where air flow velocity is substantially different than the average air flow velocity in the duct, a large measurement error will result. Attempts to address these problems have taken two directions. The first is sensor arrays where the multiple sensing elements are distributed across the duct cross section with their outputs averaged electrically. The second involves sensing elements of larger overall surface area which are distributed across the duct cross section. Both attempts to solve the problem have limitations. The former type of system increases cost and decreases reliability due to the added sensors and averaging circuitry. The latter approach increases the power required substantially, since the entire exposed surface exchanges heat with the air and power increases directly with the increase in the sensing element surface area.

It is clear that there has existed a long and unfilled need for a unit and system for sensing fluid flow velocity which is accurate at low flow velocity, which is insensitive to localized variations in air flow velocity, which is capable of compensating for changes in the ambient temperature of the fluid whose velocity is being sensed, and which requires substantially reduced power with respect to existing systems.

SUMMARY OF THE INVENTION

It is an object of the invention to provide a unit and system for sensing fluid flow which is accurate at low flow velocities.

It is also an object of the invention to provide a unit and system for sensing fluid velocity which is insensitive to localized variations in velocity which may be created due to the design or installation of ducts or pipes carrying the fluid.

It is further an object of the invention to provide a fluid velocity sensing unit and system which is capable of compensating for changes in ambient fluid temperature over a defined operating temperature range.

It is yet further an object of the invention to provide a unit and system for sensing fluid velocity which operates at substantially reduced power with respect to systems heretofore known.

It is yet further an object of the invention to provide a unit and system for sensing fluid velocity which is more resistant to wear and other use-generated degradation than systems which have heretofore been known.

In order to achieve the above and other objects of the invention, a sensor unit which can be used in a system for sensing the velocity of a fluid according to the invention includes structure for generating heat in response to an electrical current; a plurality of thermally-conductive elements, each of the elements being thermally connected to the heat generating structure at a first end and having a second end which is exposed to a fluid whose velocity is to be measured; and structure for thermally insulating the heat generating structure with respect to the fluid whose velocity is to be measured, whereby heat flow from the heat generating means to the fluid is channeled through the thermally conductive elements so as to achieve a distributed heat flow path which results in an efficient and accurate heat flow measurement when the unit is integrated within a system for measuring the velocity of the fluid.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
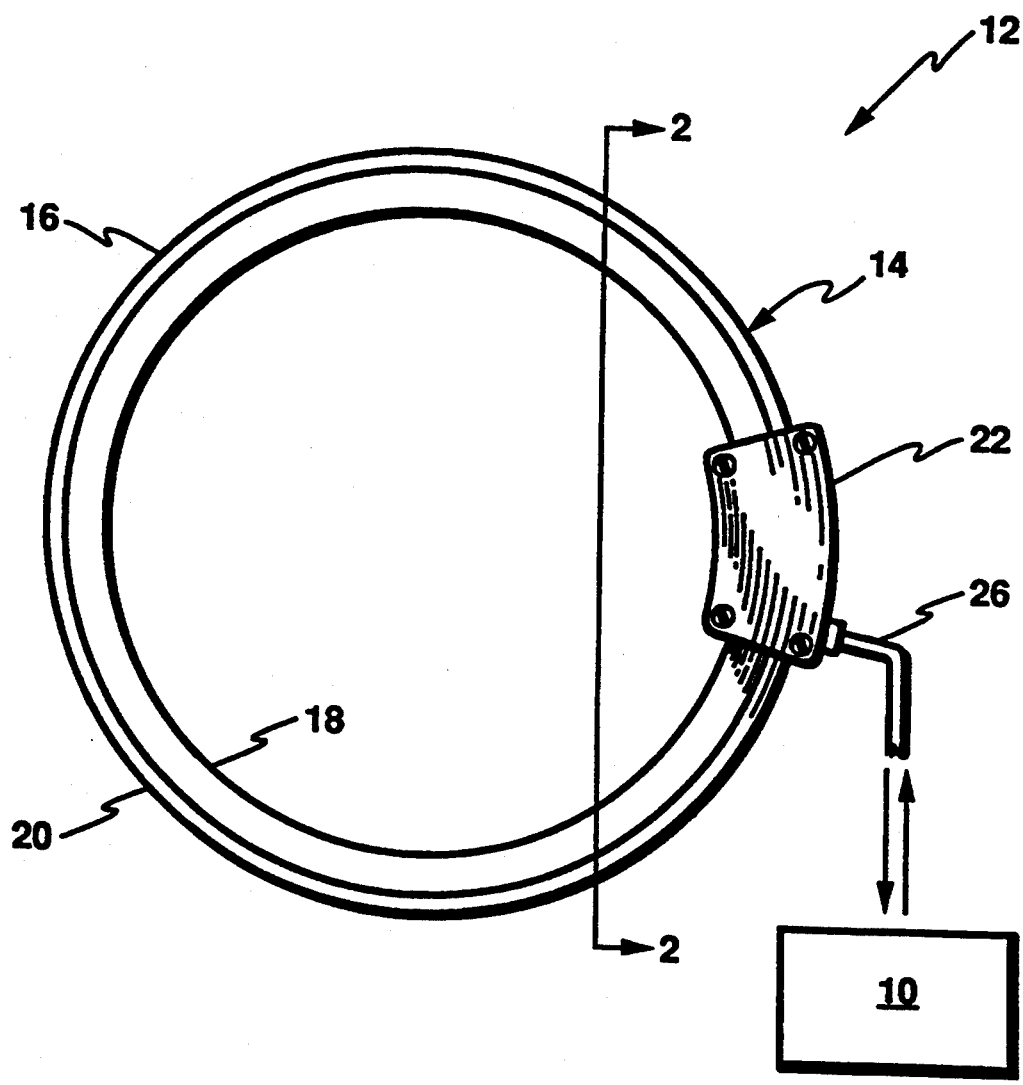
FIG. 1 is a diagrammatical view of a system for sensing velocity of a gas according to a first, preferred embodiment of the invention.

Referring now to the drawings, wherein like reference numerals designate corresponding structure throughout the views, and referring in particular to FIG. 1, a heating, ventilating and air conditioning system 10 includes a system 12 for sensing the velocity of a gas such as air. In the broad sense, it should be understood that system 12 or equivalents thereof could be used for measuring the velocity of a fluid such as liquids or other types of gases other than air; the preferred embodiment of the invention, however, is intended for use within an HVAC system such as system 10.

System 12 includes a sensor unit 14 which in the preferred embodiment includes a sensor ring 16 that has an inner surface 18 and an outer surface 20. Sensor unit 14 also includes a housing 22 which connects first and second ends of sensor ring 16 and is in electronic communication with HVAC system 10 via a cord 26. As can best be seen in FIGS. 2 and 3, a plurality of stud members 28 extend in a radial direction from the inner surface 18 of sensor ring 16 to a laminated, flexible heat source/sink assembly 30 within sensor ring 16. Heat source/sink assembly 30 extends within sensor ring 16 from a first side to a second side of housing 22, in which assembly 30 is connected to an electronic control, as will be described in appropriate detail hereinbelow.

An ambient temperature sensing RTD (Resistance Thermal Device) 24 is provided within housing 22 of the system 12 so as to be exposed to fluid flow through sensor ring 16 for purposes which will be described in further detail below.

Figure 3:
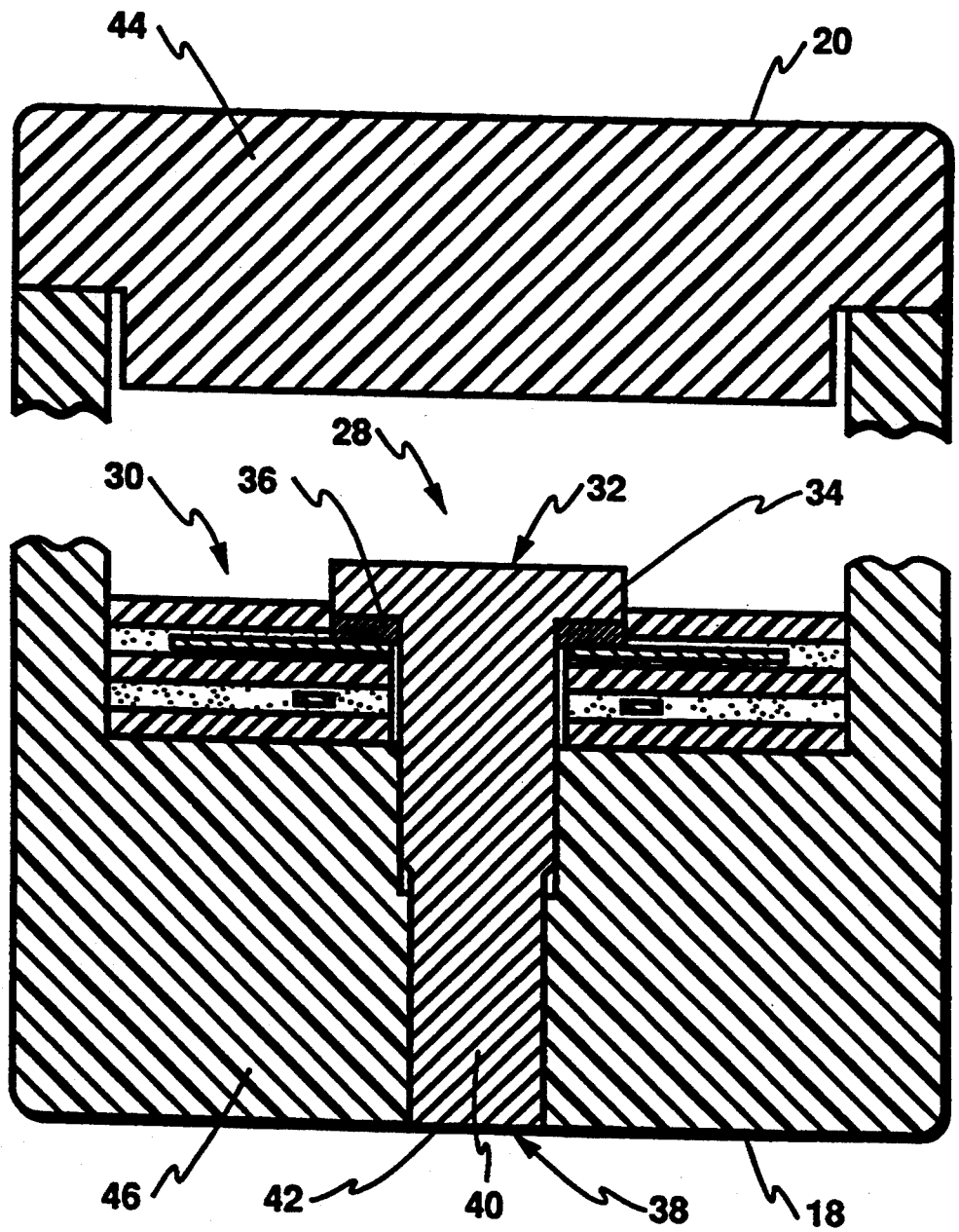
FIG. 3 is a cross-sectional view taken along lines 3—3 in FIG. 2.

Referring now to FIG. 3, each of the stud members 28 includes a first end 32 having an enlarged head portion 34 which is soldered to a continuous copper layer 50 in the laminated, flexible heat source/sink assembly 30, as will be described in greater detail below. The solder connection 36 is intended to provide a high level of thermal conductivity between the stud member 28 and the continuous copper layer 50. A second, radially inner end 38 of stud member 28 has a cylindrical portion 40 having flat end surface 42 defined thereon which is flush with the inner surface 18 of sensor ring 16. The entire stud member 28 is preferably fabricated from a metallic material which has a low thermal resistivity, such as steel, copper, tin or phosphor bronze, and is preferably fabricated from tin-plated phosphor bronze.

Referring again to FIG. 3, sensor ring 16 has an outer housing which includes an outer substrate 44 and an inner substrate 46. Both outer substrate 44 and inner substrate 46 are fabricated from a material which exhibits relatively high thermal resistance characteristics. Most preferably, both outer substrate 44 and inner substrate 46 are fabricated from a material such as an ABS polymer or equivalent polymeric material that is easily moldable and has a high thermal resistivity. Outer substrate 44 is preferably constructed so as to mechanically snap onto inner substrate 46, thus forming a protective enclosure for the laminated, flexible heat source/sink assembly 30, as is shown in cross section in FIG. 3.

Figure 4:
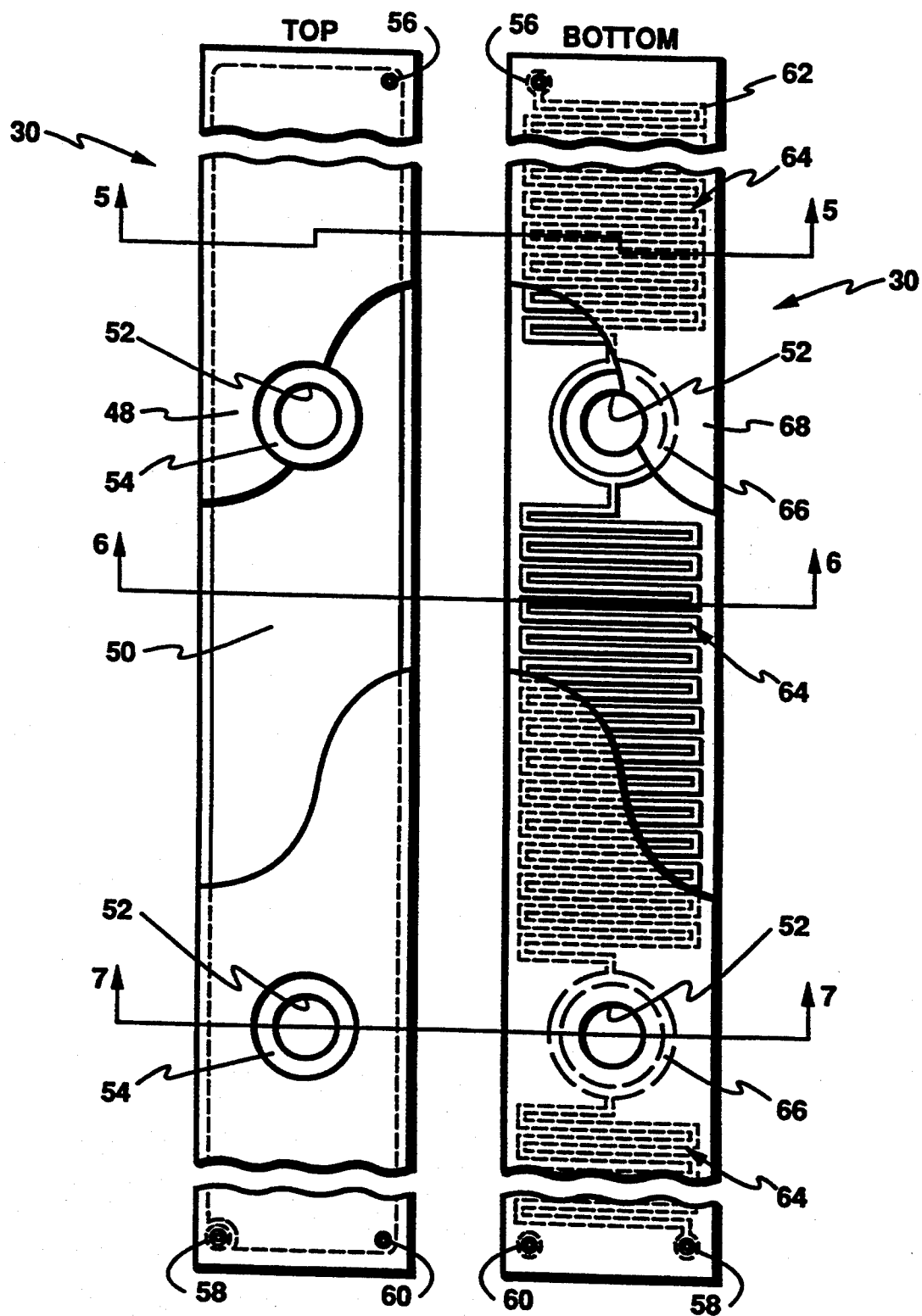
FIG. 4 depicts partially fragmented top and bottom views, respectively, of adjacent, identical components of the system which is illustrated in FIGS. 1-3.

FIG. 4 illustrates top and bottom surfaces, respectively, of adjacent heat source/sink assemblies 30 which have been removed from the respective sensor rings 16 and have been stretched out in a linear fashion. As may be seen in FIG. 4, the top surface of an assembly 30, which would be the radially outer surface when the assembly 30 is in its assembled position within sensor ring 16, includes a translucent top protective layer 48, which is preferably fabricated from polyimide film or an equivalent material, such as fiberglass-reinforced polyimide, polyester film or an open weave fiberglass cloth with epoxy encapsulation or polyester encapsulation. Alternatively, top cover 48, which is also shown in cross section in FIGS. 5–7, could be fabricated from a random fiber paper with an epoxy adhesive, a silicone rubber with fiberglass reinforcement or a mica or similar mineral composition having an inorganic or organic binder. Beneath top cover 48 and extending substantially along the length of the assembly 30 is the continuous copper layer 50 referred to hereinabove. Intermittently spaced large diameter holes 52 are defined in the assembly 30 to permit insertion of the stud members 28. A solder ring layer 54 is provided about each of the large diameter holes 52, for forming the solder connection 36 between the head portion 34 of a stud member 28 and the continuous copper layer 50 so that is illustrated in FIG. 3. Assembly 30 further includes a first plated through hole 56, a second plated through hole 58 and a third plated through hole 60, as is shown in FIG. 4.

The bottom surface of assembly 30, which would be the radially inward surface when the assembly 30 is in place within sensor ring 16, includes a translucent bottom cover 68 which is fabricated from the same materials listed above with regard to the top cover 48. A continuous thin copper strip 62 extends continuously from one end to the opposite end of the assembly 30 and is intermittently arranged in high density patterns 64 which have a closely spaced, square wave configuration and ring portions 66, which provide a path for the continuous thin copper strip 62 around the intermittent large diameter holes 52.

Figure 5:
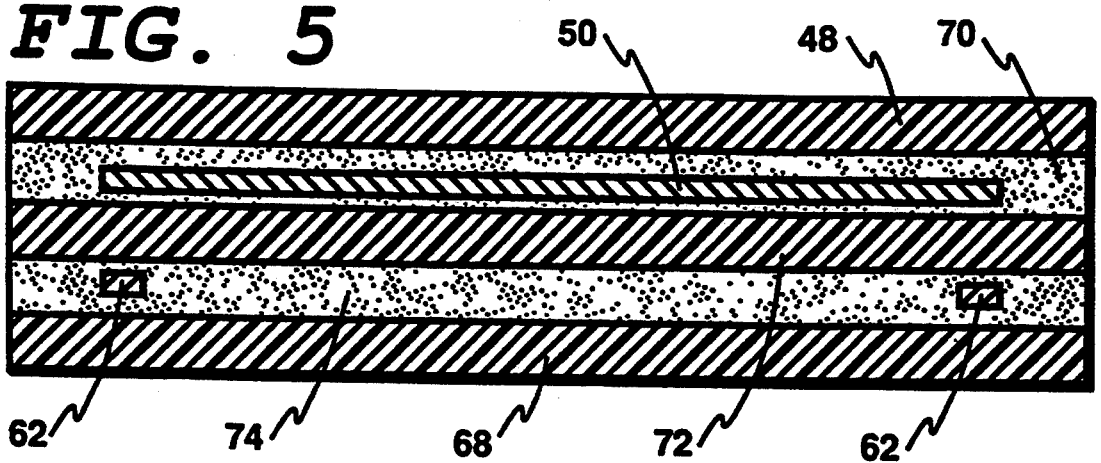
FIG. 5 is a cross-sectional view taken along lines 5—5 in FIG. 4.
Figure 6:
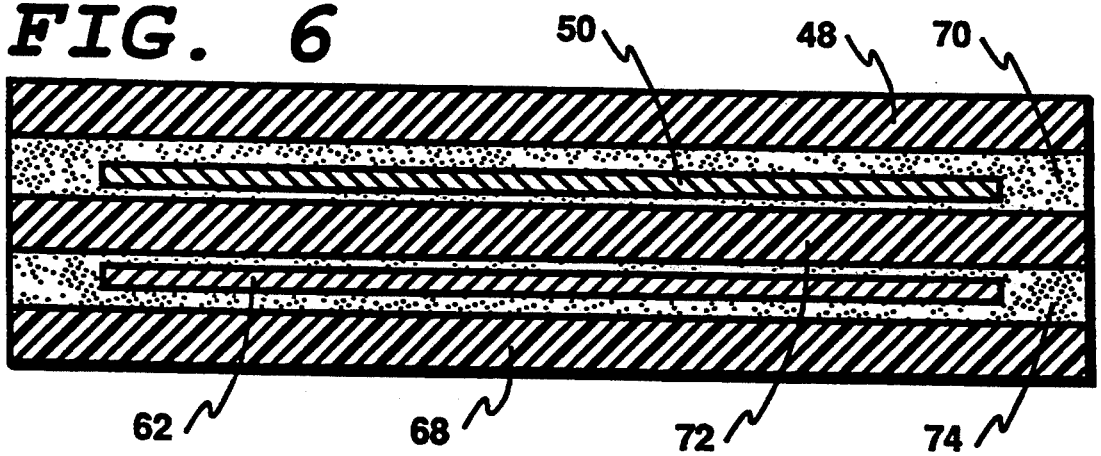
FIG. 6 is a cross-sectional view taken along lines 6—6 in FIG. 4.
Figure 7:
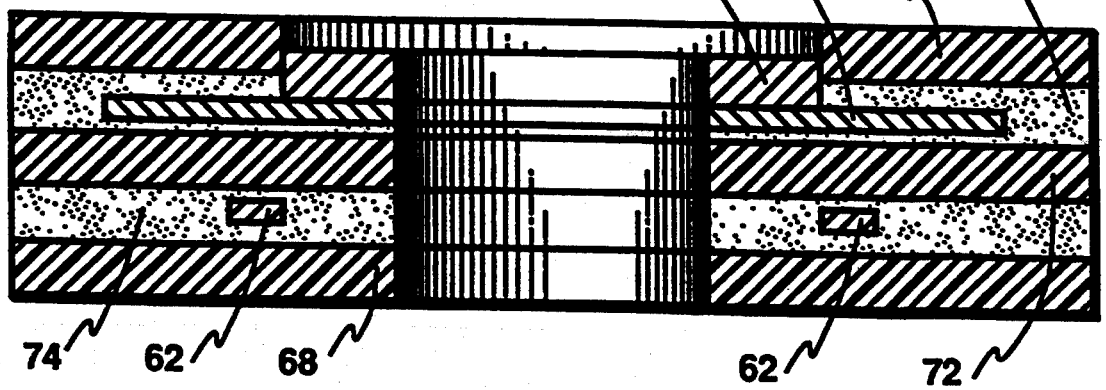
FIG. 7 is a cross-sectional view taken along lines 7—7 in FIG. 4.

Referring now to FIGS. 5–7, which illustrate various cross sections through the assembly 30, the continuous copper layer 50 is encapsulated within an adhesive 70, which preferably is an acrylic or epoxy composition. Alternatively, adhesive 70 could be formed of polyester or an equivalent adhesive composition. As may be further seen in FIGS. 5–7, the adhesive layer 70 is built upon a film base 72, which preferably is fabricated of polyimide. Alternatively, film base 72 could be fabricated from any one of the materials listed above in regard to the top cover film 48. The continuous, thin copper strip 62 is encapsulated within an adhesive 74 which is laminated upon the bottom or radially inner surface of the base film 72. Adhesive 74 is preferably fabricated from an epoxy or an acrylic composition, and is preferably identical to the material which is used to fabricate adhesive layer 70. Adhesive layer 74 also acts to bond bottom cover 68 to the base film 72, as adhesive layer 70 bonds top cover film 48 to base film 72, as may be seen in FIGS. 5–7.

It will be seen from FIG. 4 that the first plated through hole 56 electrically connects a first end of the continuous, thin copper strip 62 to a corresponding first end of the continuous copper layer 50 on the top surface of the assembly 30. The second plated through hole 58 is not electrically connected to continuous copper layer 50, but is connected to the second, opposite end of the continuous copper strip 62. The third plated through hole 60 is connected to a second end of the continuous copper layer 50, and is not connected at all to the continuous thin copper strip 62. As a result, a current may be applied across the continuous, thin copper strip 62 by placing opposite leads through the first plated through hole 56 and the second plated through hole 58, respectively. Alternatively, the same effect could be achieved by placing the leads through the third platted hole 60 and the second plated hole 58.

Figure 2:
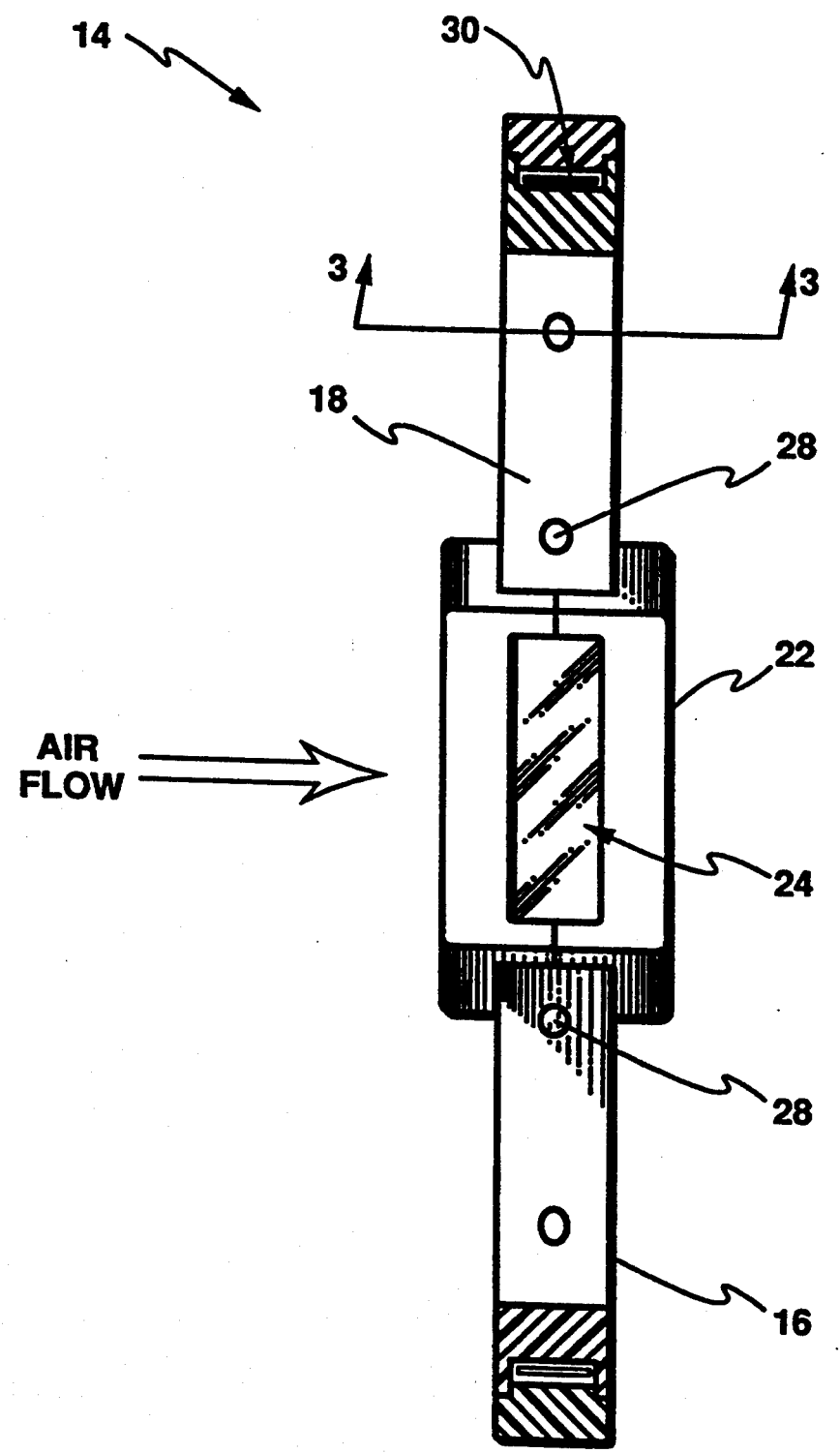
FIG. 2 is a cross-sectional view taken along lines 2—2 in FIG. 1.
Figure 8:
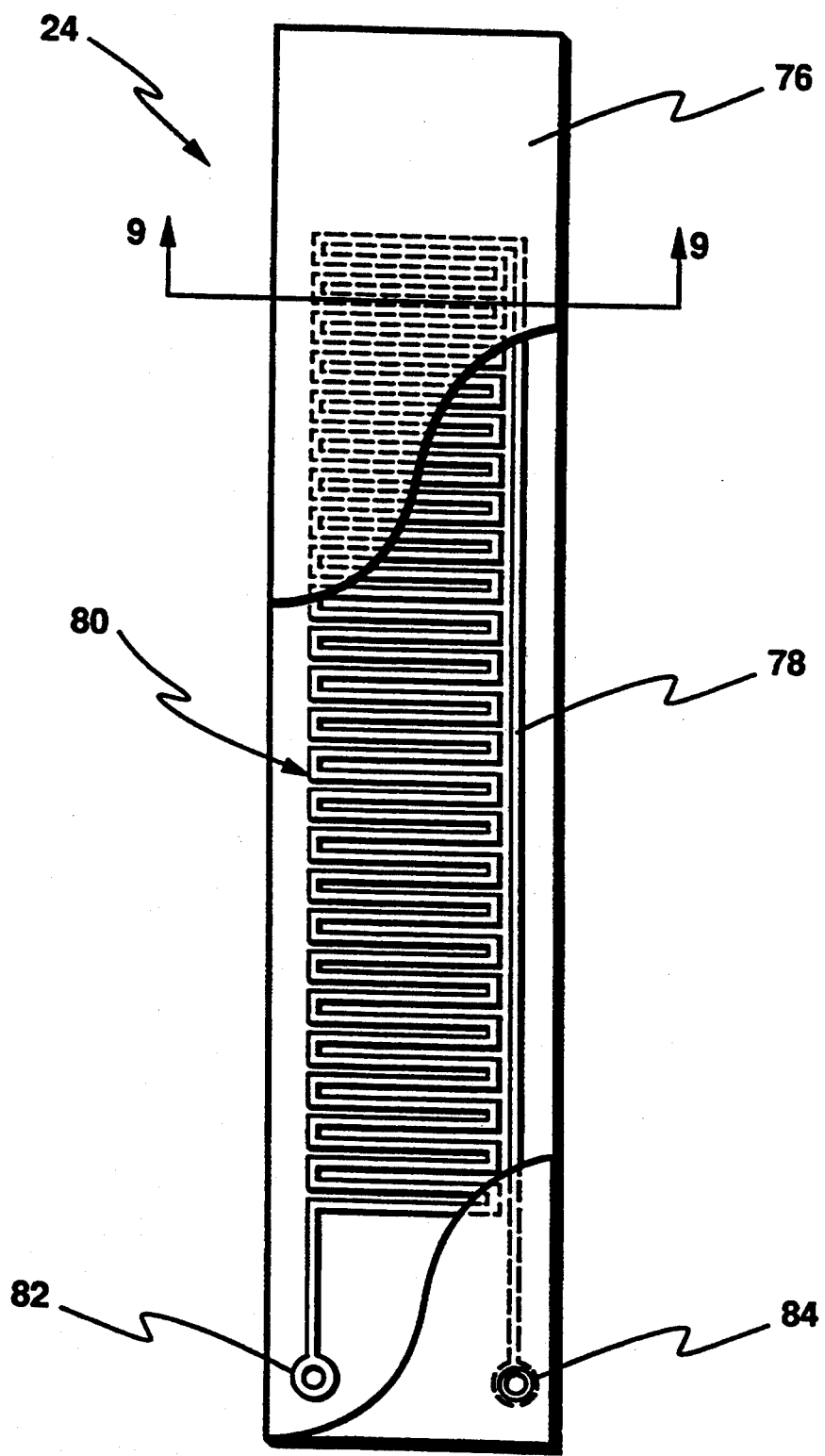
FIG. 8 is a top plan view of a second component from the embodiment of the invention which is illustrated in FIGS. 1-7.
Figure 9:
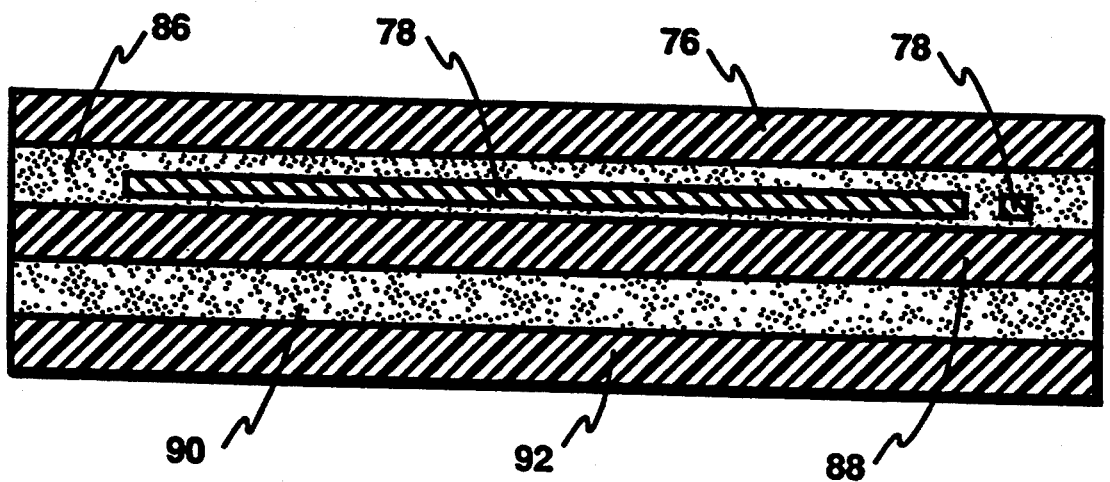
FIG. 9 is a cross-sectional view taken along lines 9—9 in FIG. 8.

Referring now to FIGS. 8 and 9, the ambient temperature sensing RTD 24 previously shown and discussed with reference to FIG. 2 is preferably constructed of a laminated assembly which includes a top cover film 76 and a continuous thin copper strip 78. Copper strip 78 is preferably encapsulated within an adhesive 86 which is used to bond a bottom surface of top cover film 76 to a top surface of a base film 88. The assembly may further include a bottom cover film 92 which is laminated to a bottom surface of the base film 88 by an adhesive 90. The top and bottom cover films 76, 92 are preferably fabricated from the same material as the films 48, 68 in the heat source/sink assembly 30 described above. Correspondingly, base film 88 is preferably fabricated from the same material as the base layer 72 described hereinabove with reference to assembly 30, and the adhesive layers 86, 90 are preferably fabricated from the same type of adhesive as the adhesive layers 70, 74 in the assembly 30. Although the bottom cover 92 and adhesive layer 90 are not strictly necessary for the operation of the ambient temperature sensing RTD 24 as it will be described below, it is contemplated that RTD 24 could be more efficiently manufactured as a continuous strip with the heat source/sink assembly 30 and then separated and installed into a system 12.

Referring again to FIGS. 8 and 9, it will be seen that the continuous thin copper strip 78 is formed in a high density pattern 80. Strip 78 has a first end which is connected to a first plated through hole 82, and a second end which is connected to a second plated through hole 84.

Figure 10:
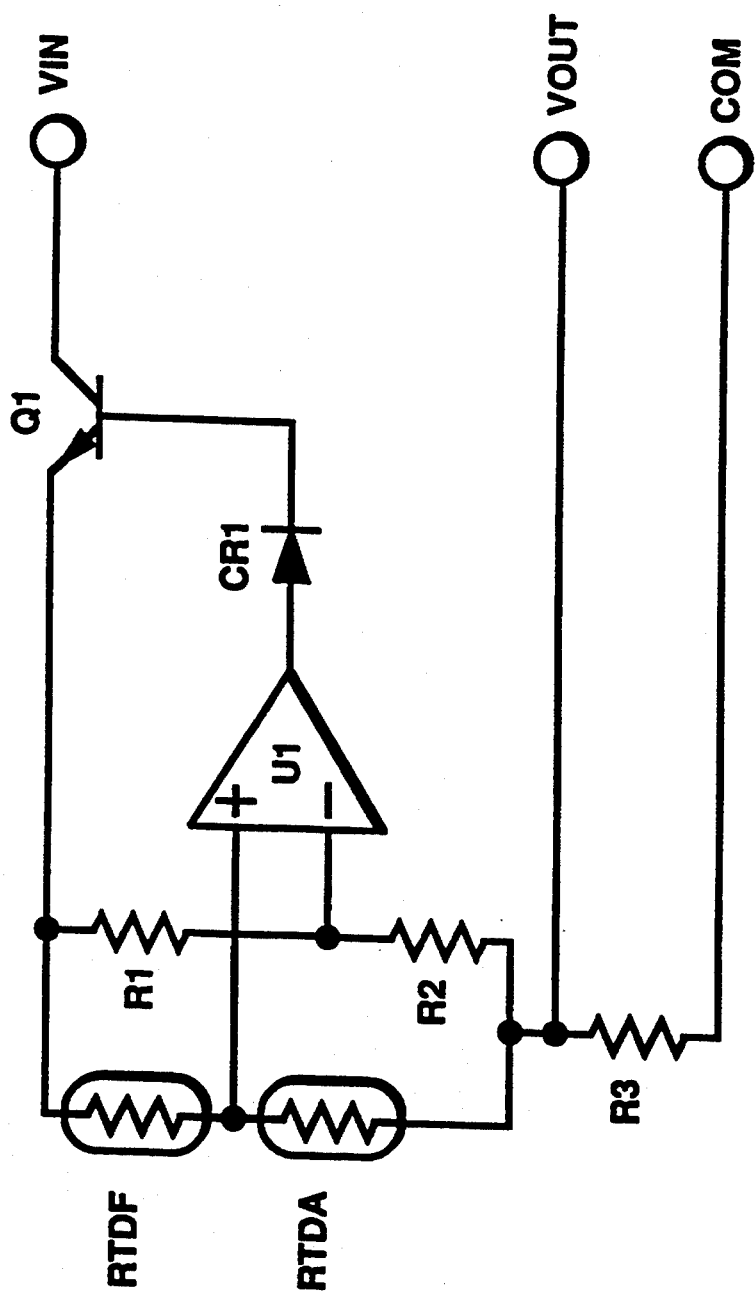
FIG. 10 is a schematic diagram of a first preferred embodiment of a control circuit according to the invention.

A first preferred embodiment of a control system is illustrated in FIG. 10. The control system is preferably physically located within housing 22 and is preferably physically interconnected electrically on a printed wiring assembly using processes of common practice. Alternatively, the control system could be physically provided along with HVAC system 10, which is the preferred mode for housing control systems constructed according to the embodiments of FIGS. 11 and 16. Referring again briefly back to FIG. 4, the continuous thin strip of copper 62, in conjunction with first plated through hole 56 and second plated through hole 58, or alternatively, third plated hole 60, continuous copper layer 50, first plated through hole 56, continuous thin copper strip 62, and second plated through hole 58 form a continuous path for electrical current flow with resistance and a resistance temperature coefficient that are well-defined functions of the length, width and thickness of the conductive elements. These elements therefore form a resistance thermal device hereinafter referred to as "RTDF". RTDF exhibits the properties normally associated with resistance thermal devices including the generation of heat as a well-defined function of the electrical power supplied to the RTDF. RTDF can therefore be operated as a heat source with well-defined properties.

The term "RTDA" refers to the ambient temperature sensing resistance thermal device which has been illustrated and described with reference to FIGS. 8 and 9. RTDA includes plated through hole 82, the continuous thin copper strip 78 and plated through hole 84.

Referring again to FIG. 10, VIN and COM are the positive and negative terminals, respectively, of an external direct current voltage source. The printed wiring assembly provides an inter-connection for the output signal VOUT in FIG. 10. Output signal VOUT is proportional to the fourth root of air flow velocity. This signal is analyzed by a microcomputer based control located in HVAC system 10 to monitor air flow and/or control the air flow through a valve or damper output device. In other types of systems, similar, known circuitry such as analog based control will analyze VOUT and make whatever adjustments are necessary in that system.

At steady state operation, the control circuit illustrated in FIG. 10 has operational amplifier U1 maintain the voltage at its positive input terminal equal to the voltage at its negative input terminal by continuously adjusting its output voltage through diode CR1, causing adjustment to the flow of current from the VIN supply through transistor Q1 to the resistor network consisting of R1, R2, R3, RTDF, and RTDA. The steady state operating condition can only be achieved by maintaining the ratio RTDF/RTDA equal to the ratio R1/R2.

The component values of R1, R2, RTDF and RTDA are selected so that the resistance of RTDF that satisfies the steady state operating condition is only achieved at a temperature substantially above the temperature of RTDA. When power is first applied to the circuit, the temperature of RTDF is equal to the temperature of RTDA, and is well below the temperature required for the circuit to achieve the steady state operating condition described above. The voltage at the positive input terminal of U1 is greater than the voltage at the negative input terminal of U1. Therefore, the operational amplifier U1 increases its output voltage through diode CR1 causing increased flow of current from the VIN supply through transistor Q1 to raise by self-heating, RTDF's temperature and proportionally its resistance, until the resistance that satisfies the steady state operating condition described above is achieved.

As air begins to flow against the composite heat exchange surface formed by inner surface 18 and flush surface 42, heat conducted from the resistance thermal device RTDF through adhesive 74, base film 72, adhesive 70, continuous copper layer 50 and solder layer 36 to the stud members 28 is metered to the air stream at well-defined, multiple locations distributed along the sensing element surface, decreasing RTDF's temperature and proportionally its resistance. Operational amplifier U1 senses the voltage increase caused by the decrease of RTDF's resistance as heat is removed to the air stream. In response to the change, the operational amplifier U1 increases its output voltage through diode CR1 causing increased flow of current from the VIN supply through transistor Q1 to raise, by self-heating, RTDF's temperature and proportionally its resistance until the resistance that satisfies the steady state operating condition described above is achieved.

If the air flow velocity increases, more heat is removed, decreasing RTDF's temperature and proportionately its resistance. Operational amplifier U1 senses the voltage increase caused by the decrease of RTDF's resistance as more heat is removed to the air stream. In response to the change, the operational amplifier U1 increases its output voltage through diode CR1 causing increased flow of current from the VIN supply through transistor Q1 to raise, by self-heating, RTDF's temperature and proportionately its resistance until the resistance satisfies the steady state operating condition described above is achieved.

If the air flow velocity decreases, less heat is removed, increasing RTDF's temperature and proportionately its resistance. Operational amplifier U1 senses the voltage decrease caused by the increase of RTDF's resistance as less heat is removed to the air stream. In response to the change, the operational amplifier U1 decreases its output voltage through diode CR1 causing decreased flow of current from the VIN supply through the transistor Q1 to lower, by heat conduction, RTDF's temperature and proportionately its resistance until the resistance that satisfies the steady state operating condition described above is achieved.

In practice, the circuit continuously responds to changes in the air flow velocity to maintain RTDF's temperature and proportionately its resistance at a value that satisfies the steady state operating condition.

If the ambient temperature of the air changes, the resistance of the ambient temperature sensing resistance thermal device RTDA changes to a new value. Operational amplifier U1 senses the voltage change caused by the new value of RTDA's resistance. In response, operational amplifier U1 increases or decreases its output voltage through diode CR1 causing the flow of current from the VIN supply through transistor Q1 to raise by self-heating or lower by heat conduction, RTDF's temperature and proportionately its resistance until the resistance of RTDF is again equal to the resistance that satisfies the steady state operating condition.

In practice, the circuit continuously responds to changes in the ambient air temperature to maintain RTDF's temperature and proportionately its resistance at the value that satisfies the steady state operating condition. Thus, the interconnection of components R1, R2, U1, CR1, Q1, RTDA and RTDF as illustrated schematically in FIG. 10 functions to maintain the resistance thermal device RTDF's temperature and proportionately its resistance at the value that satisfies the steady state operating condition to maintain steady state heat conduction to the air stream, or to respond to changes in heat conduction caused by changes in the air flow velocity or by changes in the ambient temperature of the air.

The power to maintain RTDF at the resistance that satisfies the steady state operating condition is equal to the heat transferred to the air stream. The heat transferred to the air stream is proportional to the product of the temperature difference between RTDF and RTDA and the square root of air flow velocity. The current through RTDF is equal to the square root of the ratio of the power dissipated by RTDF to the resistance of RTDF. R1, R2, RTDA and RTDF are dimensioned so that the resistance of RTDF increases or decreases proportionally with the temperature difference between RTDF and RTDA, maintaining the current through RTDF independent of the ambient air temperature at the steady state operating condition. Thus, the current through RTDF is proportional to the fourth root of air flow velocity. Further, with R1 and R2 dimensioned so that they have significantly greater resistance with respect to RTDF and RTDA, the current through R3 will be nearly equal to the current through RTDF. The voltage drop across R3, VOUT, is equal to the product of the current through R3 and the resistance of R3. Thus, VOUT is proportional to the current through RTDF with negligible error and is therefore proportional to the fourth root of the air flow velocity with negligible error.

Figure 11:
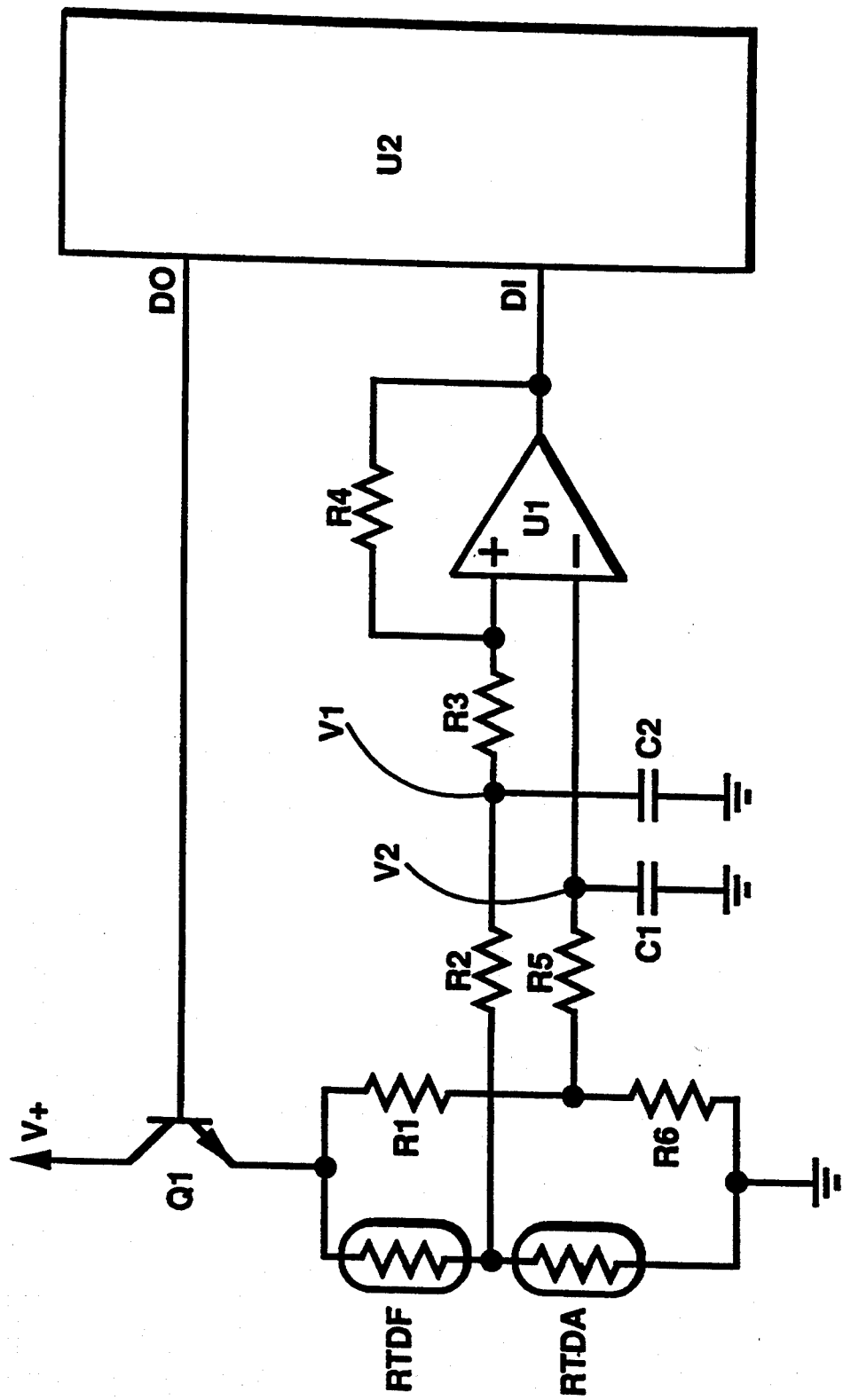
FIG. 11 is a schematic diagram depicting a second, preferred embodiment of the control circuit.

A second, preferred embodiment of the control circuit is schematically illustrated in FIG. 11. In contrast to the linear circuit illustrated schematically in FIG. 10, the circuit of FIG. 11 is a non-linear circuit employing a microcomputer for logic and computational functions.

The circuit in FIG. 11 performs the same general function as the circuit of FIG. 10, however, the power is supplied to RTDF by frequency modulation (constant pulse width/variable period) or by pulse width modulation (constant period/variable pulse width) of current from the voltage source V+ through transistor Q1. Initially, the circuit functions to supply sufficient power to the resistance thermal device RTDF to substantially elevate the temperature of RTDF above the temperature sensed by the ambient temperature sensing resistance thermal device RTDA. Further, the circuit varies the air flow sensing resistance thermal device's temperature with respect to the temperature sensed by the ambient temperature sensing resistance thermal device to maintain steady state heat conduction to the air stream, or to respond to changes in heat conduction caused by changes in the air flow velocity or by changes in the ambient temperature of the air. U2 is a microcomputer, for example, a Motorola 68HC11 or NEC 78C11. U2 provides a digital output, DO, that drives the transistor, Q1, on (into saturation) and off (into cutoff). U2 provides a digital input, DI, that senses the logic state of the output of the voltage comparator described below.

The operational amplifier U1 and resistors R3 and R4 form a voltage comparator with a small hysterisis window. The voltage comparator so formed operates on voltages V1 and V2 to produce a logic level output that is connected to digital input DI on microcomputer U2. The logic level output of the voltage comparator is a logic HI when V1 is greater than V2 plus one half of the hysteresis window and is a logic LO when V1 is less than V2 minus one half of the hysteresis window. In the functional description hereinbelow of the circuit illustrated in FIG. 11, the hysteresis effect is assumed in a simplified voltage comparator transfer function such that the logic level output of the voltage comparator is HI when V1 is greater than V2 and is LO when V1 is less than V2.

Resistor R2 and capacitor C2 form an averaging circuit with an output V1 that is the time average of the voltage at the common interconnection of RTDF, RTDA and R2.

Resistor R5 and capacitor C1 form an averaging circuit with output V2 that is the time average of the voltage at the common interconnection of R1, R6 and R5.

Figure 12:
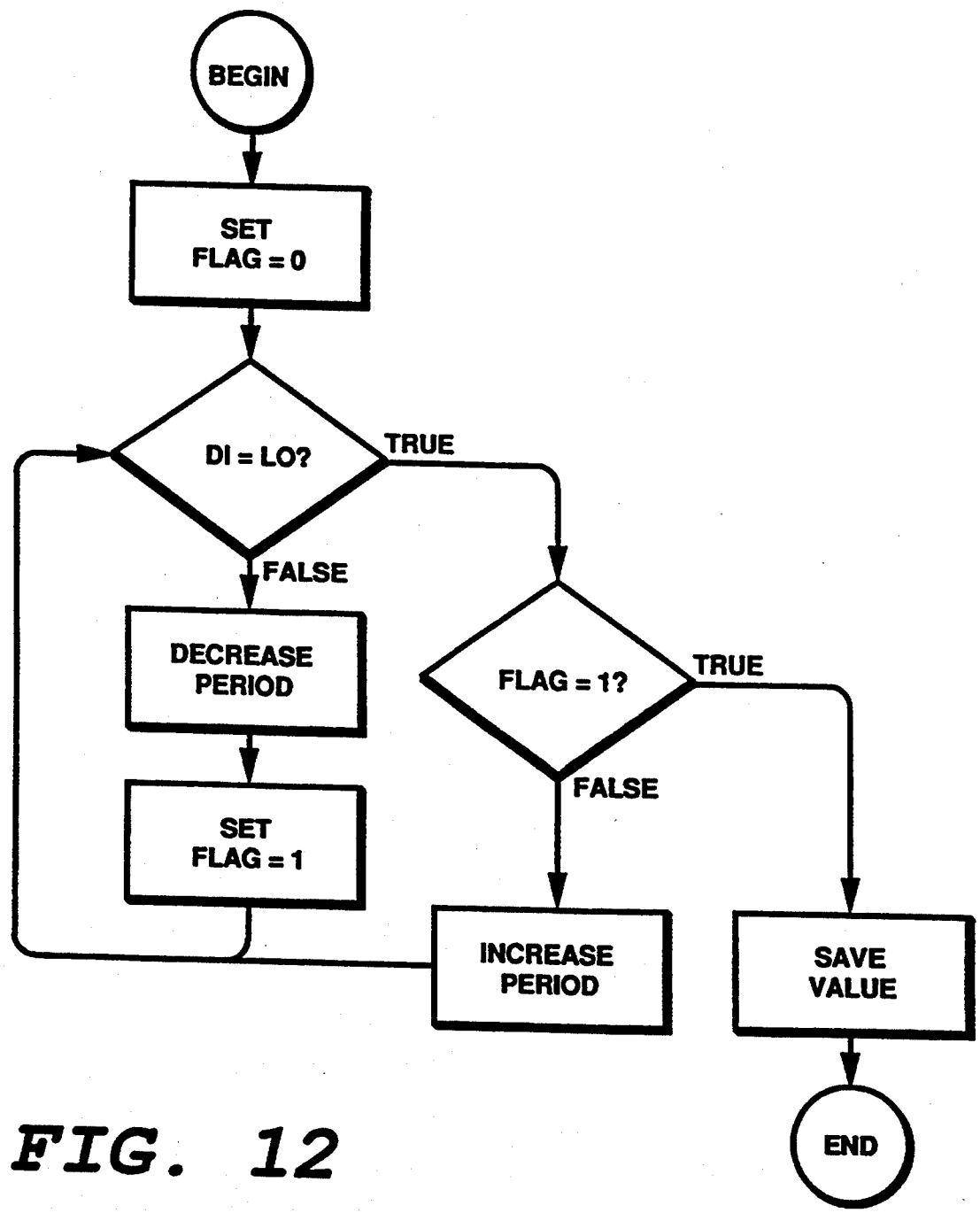
FIG. 12 is a decision flow chart of an air flow measurement algorithm which is used in conjunction with the control circuit that is illustrated in FIG. 11.
Figure 13A:
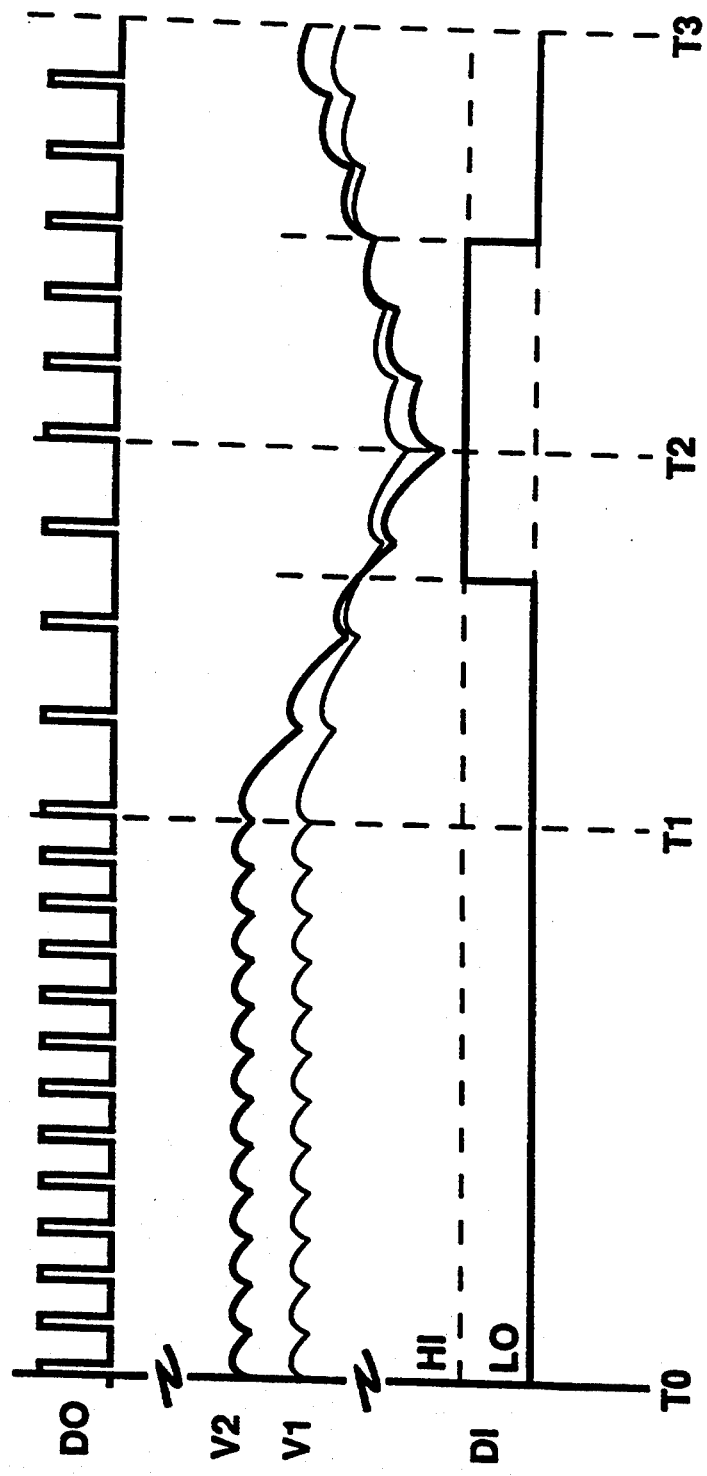
FIGS. 13(a) and 13(b) are primary signal diagrams which illustrate operation of the invention according to the embodiment which is illustrated in FIG. 11.
Figure 13B:
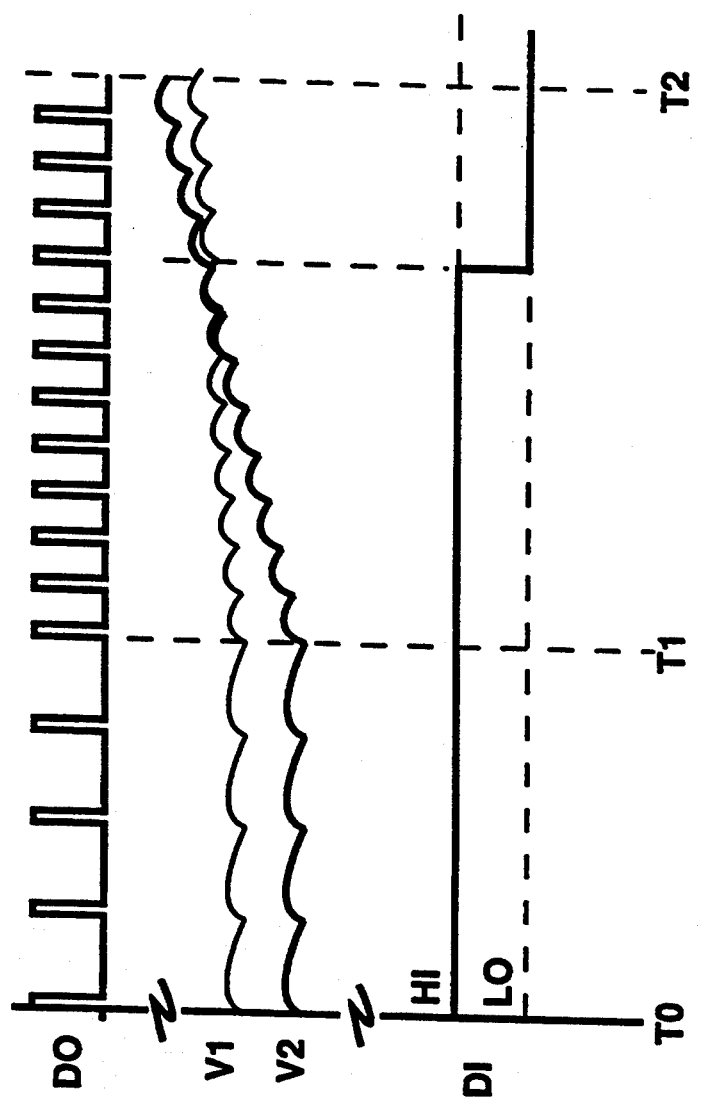
Figure 14:
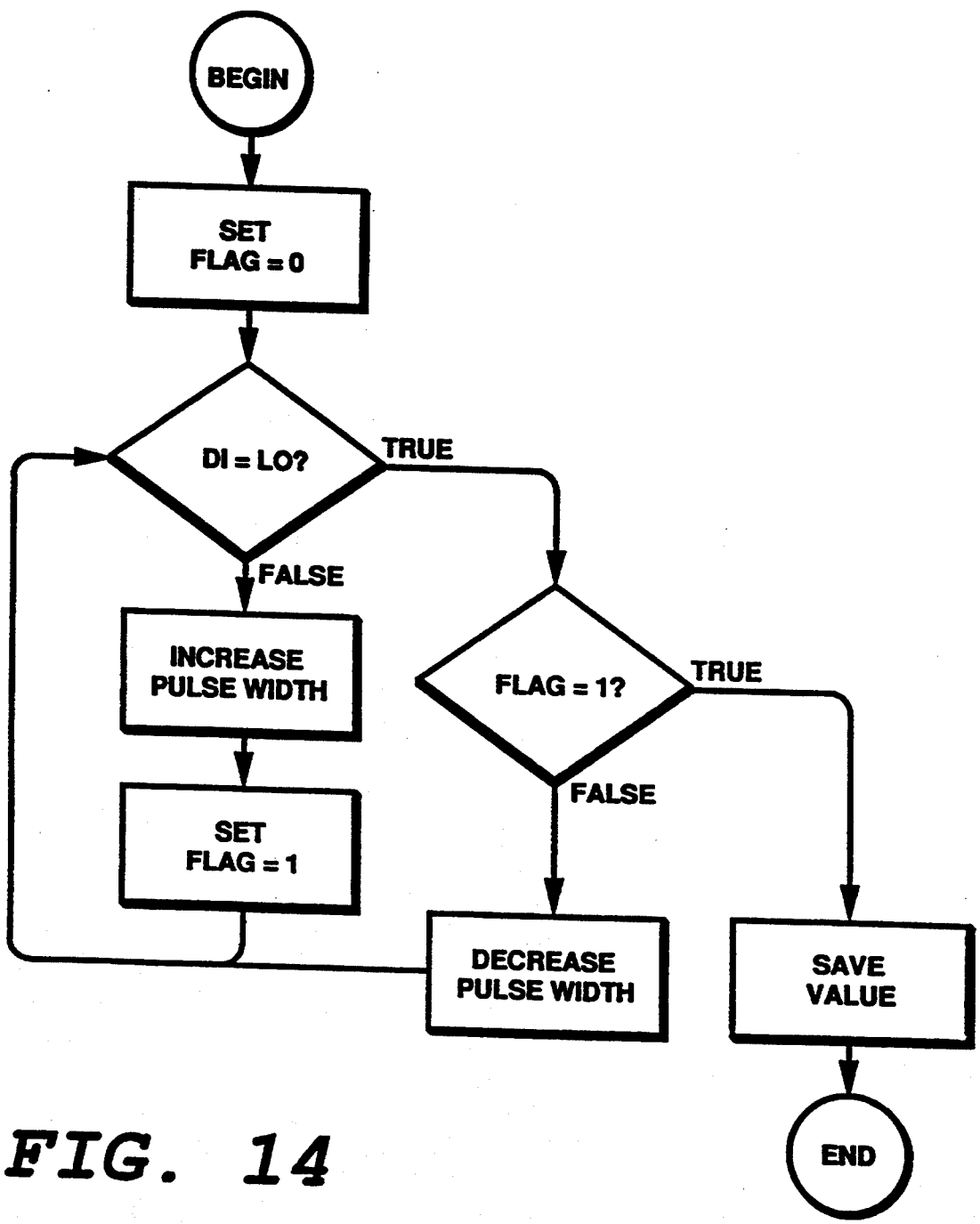
FIG. 14 is a decision flow chart of an air flow measurement algorithm which depicts operation of the control circuit illustrated in FIG. 11 in a second operational mode.
Figure 15:
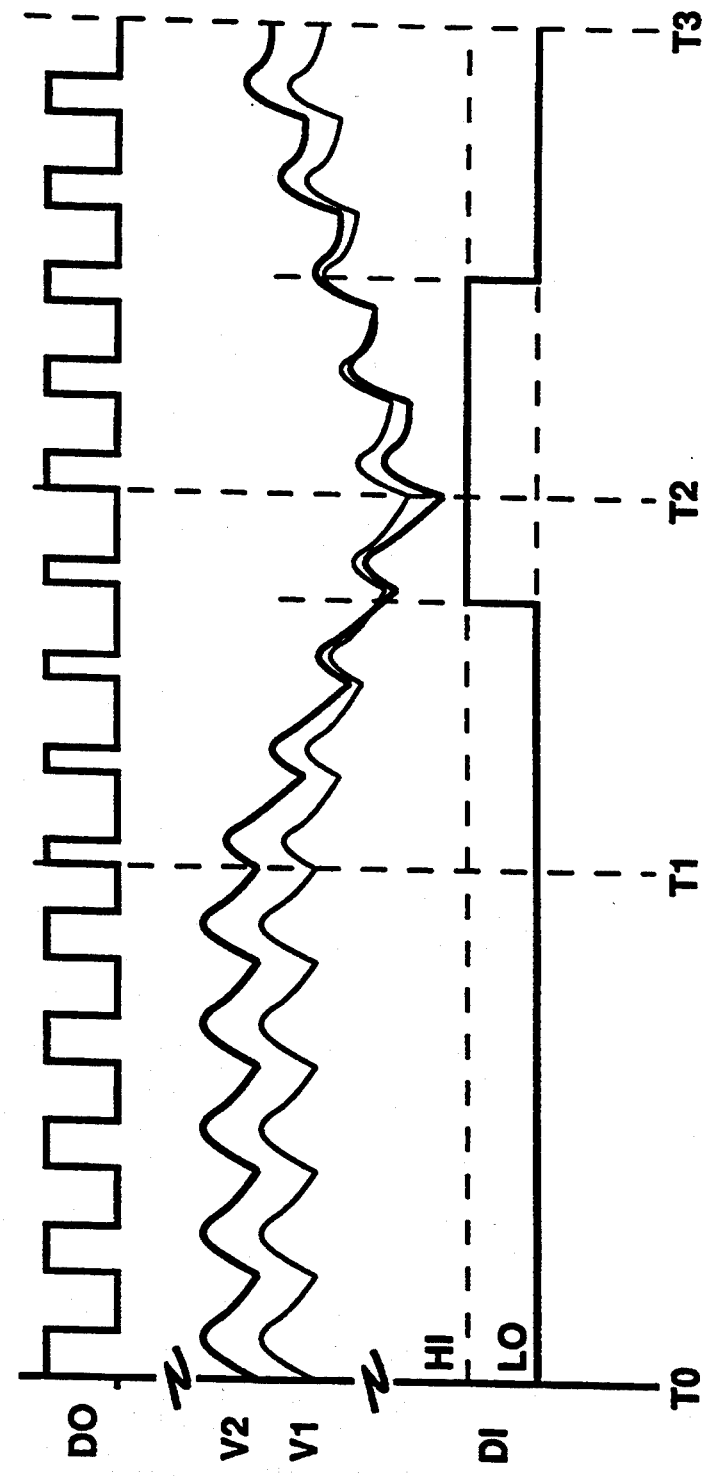
FIGS. 15(a) and 15(b) are primary signal diagrams depicting operation of the control circuit illustrated in FIG. 11 in the second operational mode depicted in FIG. 14.
Figure 15B:
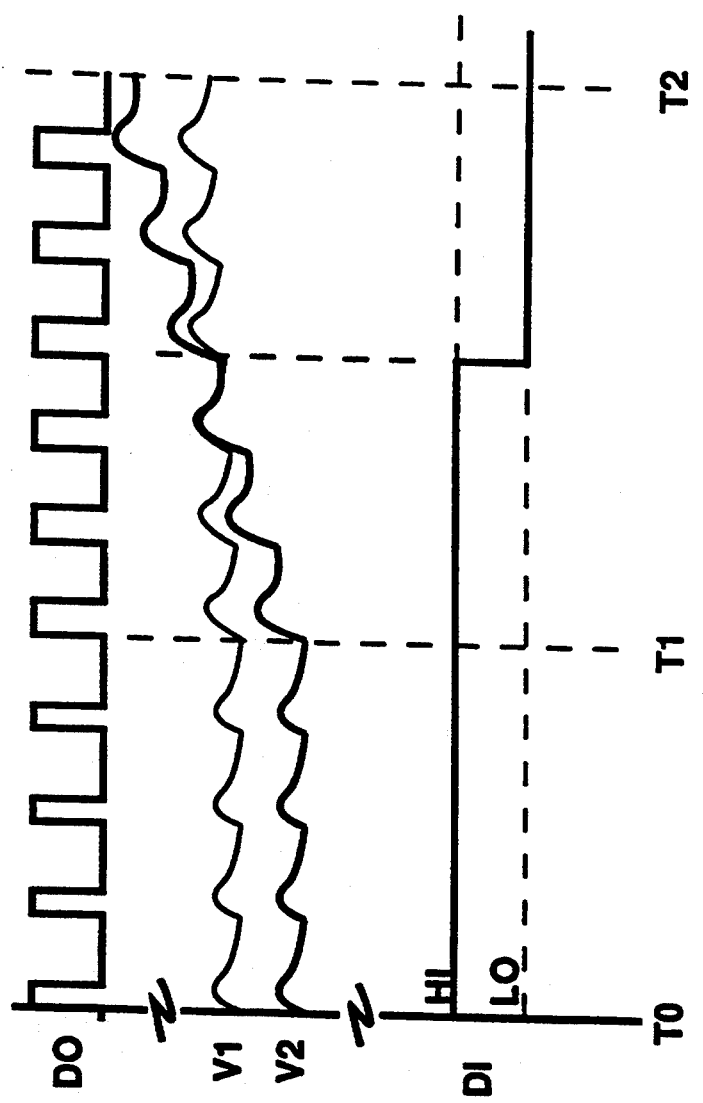

RTDF and RTDA are the air flow sensing resistance thermal device and the ambient temperature sensing resistance thermal device, respectively. R1 and R6 are fixed resistors. As said above, the circuit may be operated in a constant pulse width/variable period mode or in a constant period/variable pulse width mode. FIGS. 12, 13(a) and 13(b) illustrate operation in constant pulse width/variable period mode. FIGS. 14, 15(a) and 15(b)) illustrate operation in constant period/variable pulse width mode. Basic operation of the circuit is the same for both cases, except for the method of modulating the current supplied to RTDF from the V+ supply through transistor Q1.

I. Case 1

In the first case, assume that the circuit has been in operation so that the RTDF is at a temperature that causes its resistance to be greater than (RTDA × R1)/R6. Then, V2 will be greater than V1 and the other key signals are in states shown at T0 in FIGS. 13(a) or 15(a). Further, assume that the microcomputer has initialized its internal flag to "0". At time T1, the microcomputer U2 recognizes the LO at input DI and increases the period (or decreases the pulse width) at output DO. The increased period (or decreased pulse width) decreases the average current flowing from V+ through transistor Q1 to RTDF, causing RTDF's temperature and proportionately its resistance to decrease due to heat conduction to the air stream. The decreased average current causes both V1 and V2 to decrease. The decrease in RTDF's resistance causes V1 to decrease at a slower rate than the decrease in V2, until V2 is less than V1.

At T2, the microcomputer U2 recognizes the HI at input DI, decreases the period (or increases the pulse width) at output DO, and sets an internal flag to "1". The decreased period (or increased pulse width) increases the average current flowing from V+ through transistor Q1 to RTDF, causing RTDF's temperature and proportionately its resistance to increase due to self-heating. The increased average current causes both V1 and V2 to increase. The increase in RTDF's resistance causes V1 to increase at a slower rate than the increase in V2, until V2 is greater than V1.

At T3, the microcomputer U2 recognizes the LO at input DI, determines that the internal flag is set to "1", and derives the average current from the present value of the period or pulse width and saves the value of the average current.

II. Case 2

In the second case, assume that the circuit has been in operation so that the RTDF is at a temperature that causes its resistance to be less than (RTDA × R1)/R6. Then, V2 is less than V1 and the other key signals are in the states shown at T0 in FIGS. 13(b) or 15(b). Further, assume that the microcomputer has initialized its internal flag to "0".

At T1, the microcomputer U2 recognizes the HI at output DI, decreases the period (or increases the pulse width) at output DO, and sets an internal flag to "1". The decreased period (or increased pulse width) increases the average current flowing from V+ through transistor Q1 to RTDF, causing RTDF's temperature and proportionately its resistance to increase due to self-heating. The increased average current causes both V1 and V2 to increase. The increase in RTDF's resistance causes V1 to increase at a slower rate than the increase in V2, until V2 is greater than V1.

At T2, the microcomputer U2 recognizes the LO at input DI, determines that the internal flag is set to "1", and derives the average current from the present value of the period or pulse width and saves the value of the average current.

In practice, the sequence of operations described above will be performed several times per second, causing the value of RTDF's temperature and proportionately its resistance to be near a value defined by RTDF=(RTDA×R1)/R6. Note that this equality is identical to the relationship that defines the steady state condition for the alternate circuitry illustrated in FIG. 10.

For properly dimensioned component values, and for proper choices for operating periods and pulse widths, and for proper choice of sampling intervals (i.e., how often the sequence of operation is performed with respect to time) the results from this circuit will duplicate the results of the circuitry illustrated in FIG. 10. That is, the power required to maintain RTDF at the resistance that satisfies the steady state operating condition is equal to the heat transferred to the air stream. The heat transferred to the air stream is proportional to the product of the temperature difference between RTDF and RTDA and the square root of air flow velocity. The current through RTDF is equal to the square root of the ratio of the power dissipated by RTDF to the resistance of RTDF. R1, R6, RTDA and RTDF are dimensioned so that the resistance of RTDF increases or decreases proportionately with the temperature difference between RTDF and RTDA, maintaining the current through RTDF independent of the ambient air temperature at the steady state operating condition. Thus, the current through RTDF is proportional to the fourth root of the air flow velocity. Further, with R1 and R6 dimensioned so that they have significantly greater resistance with respect to RTDF and RTDA, the average current value derived from the present value of the period or pulse width and saved by microcomputer U2 will be nearly equal to the current through RTDF. Thus, the average current value derived from the present value of the period or pulse width and saved by microcomputer U2 is nearly equal to the current through RTDF and is therefore proportional to the fourth root of the air flow velocity with negligible error.

Figure 16:
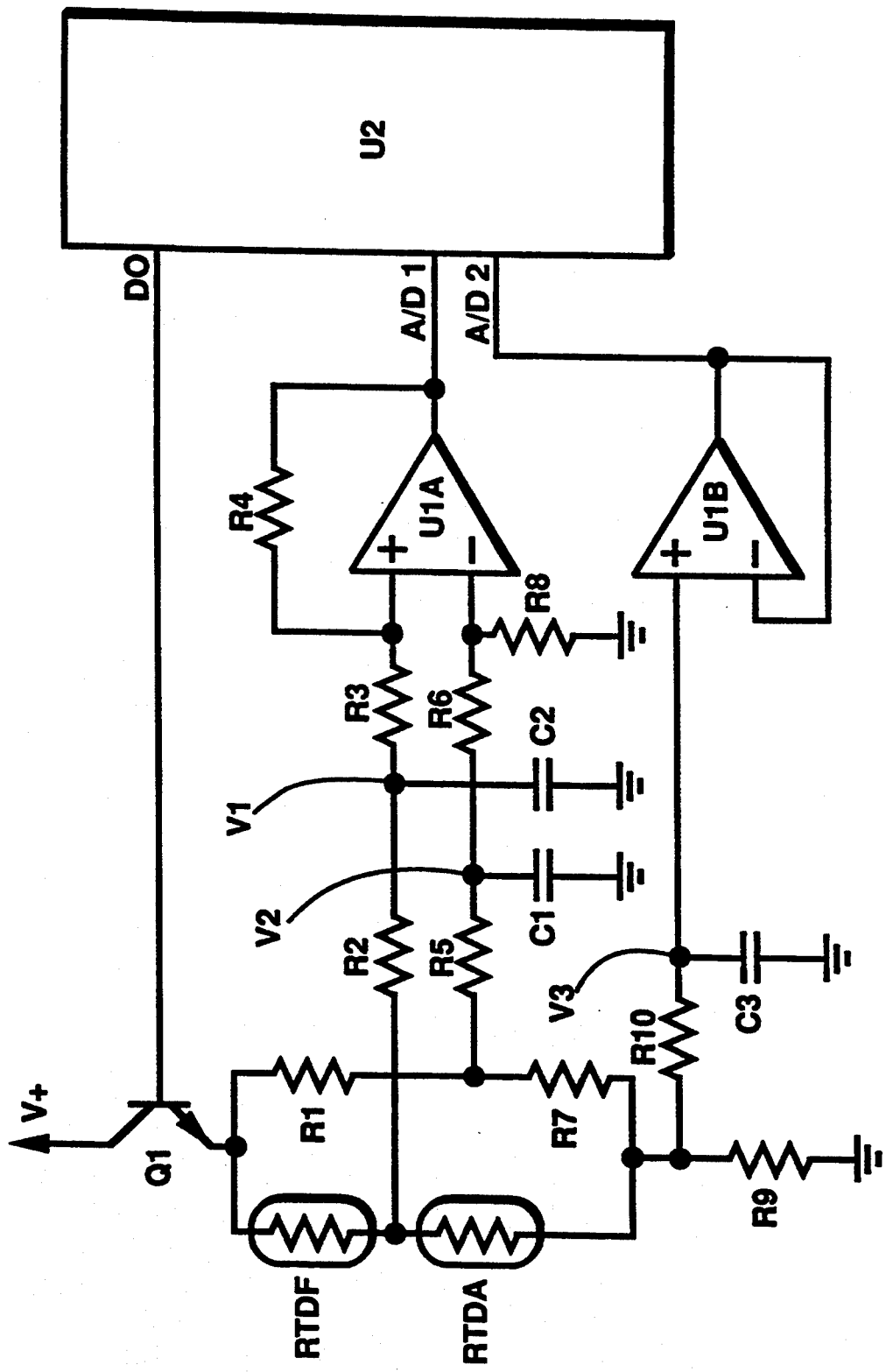
FIG. 16 is a schematic diagram of a third preferred embodiment of the control circuit.

A third preferred embodiment of the control system is schematically illustrated in FIG. 16. In contrast to the linear circuit of FIG. 10, the circuit in FIG. 16 is a non-linear circuit employing a microcomputer for logic and computational functions. The operation of the circuit in FIG. 16 is similar to the operation of the circuit in FIG. 11, however, direct measurement of the signal proportional to the current through RTDF is accomplished with an analog to digital converter on the microcomputer.

The circuit of FIG. 16 performs the same general function as the circuit in FIG. 10, however, the power is supplied to RTDF by frequency modulation (constant pulse width, variable period) or by pulse width modulation (constant period, variable pulse width) of current from voltage source V+ through transistor Q1. Initially, the circuit functions to supply sufficient power to the resistance thermal device RTDF to substantially elevate the temperature of RTDF above the temperature sensed by the ambient temperature sensing resistance thermal device, RTDA. Further, the circuit varies the air flow sensing resistance thermal device's temperature with respect to the temperature sensed by the ambient temperature sensing resistance thermal device to maintain steady state heat conduction to the air stream, or to respond to changes in heat conduction caused by changes in the air flow velocity or by changes in the ambient temperature of the air. U2 is a microcomputer, for example, a Motorola 68HC11 or NEC 78C11. U2 provides a digital output, D0, that drives the transistor, Q1, on (into saturation) and off (into cutoff). U2 provides two analog-to-digital convertor inputs, A/D1 and A/D2, that determine a digital representation of the value of the outputs of the amplifiers described below.

The operational amplifier U1A and resistors R3, R4, R6 and R8 form a differential voltage amplifier.

The operational amplifier U2A forms a unity gain, non-inverting voltage amplifier.

Resistor R2 and capacitor C2 form an averaging circuit with output V1 that is the time average of the voltage at the common interconnection of RTDF, RTDA and R2.

Resistor R5 and capacitor C1 form an averaging circuit with output V2 that is the time average of the voltage at the common interconnection of R1, R7 and R5.

Resistor R10 and capacitor C3 form an averaging circuit with output V3 that is the time average of the voltage at the common interconnection of R9 and R10.

Figure 17:
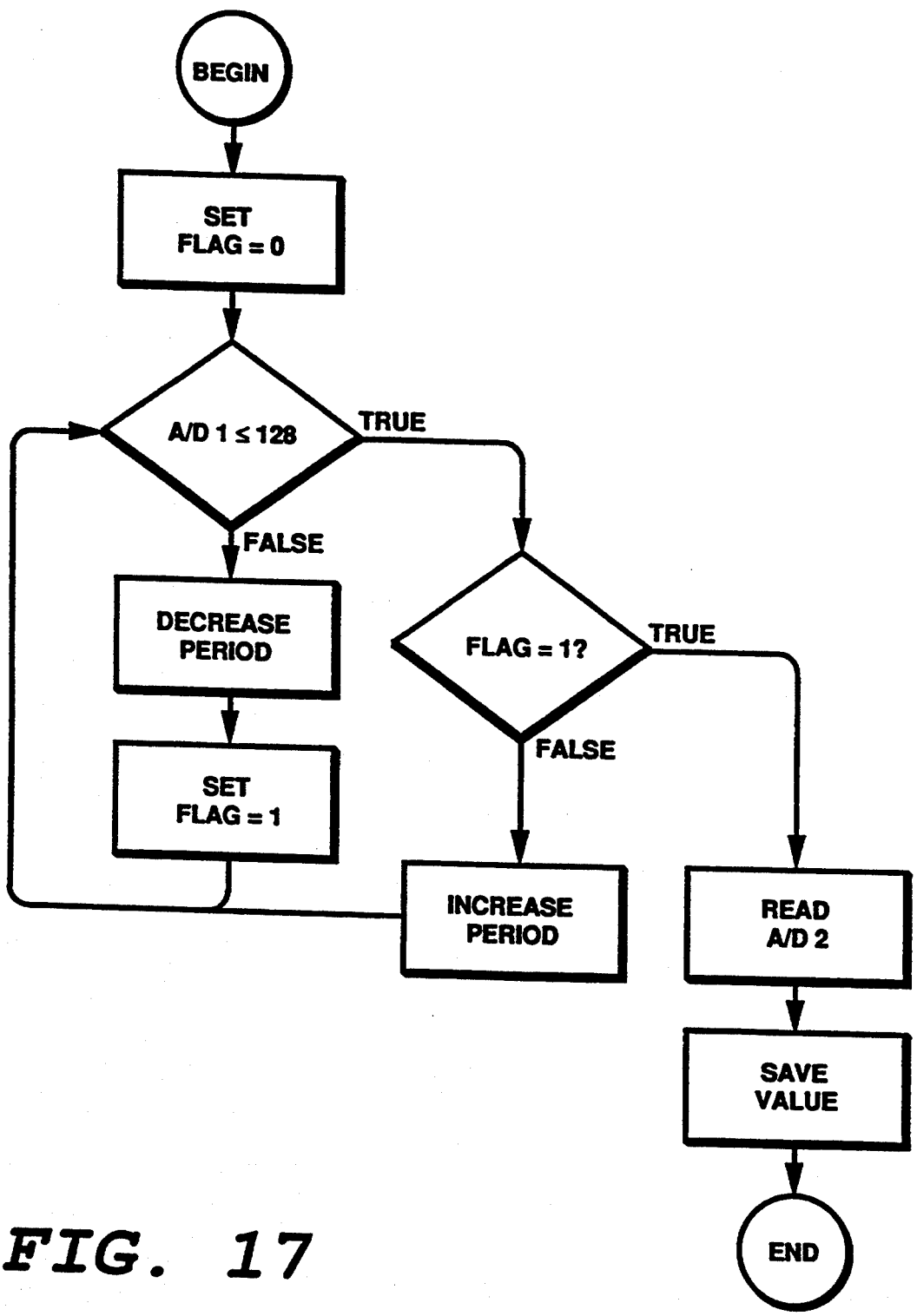
FIG. 17 is a decision flow chart of an air flow measurement algorithm illustrating operation of the control circuit in FIG. 16 in a first operational mode.
Figure 18A:
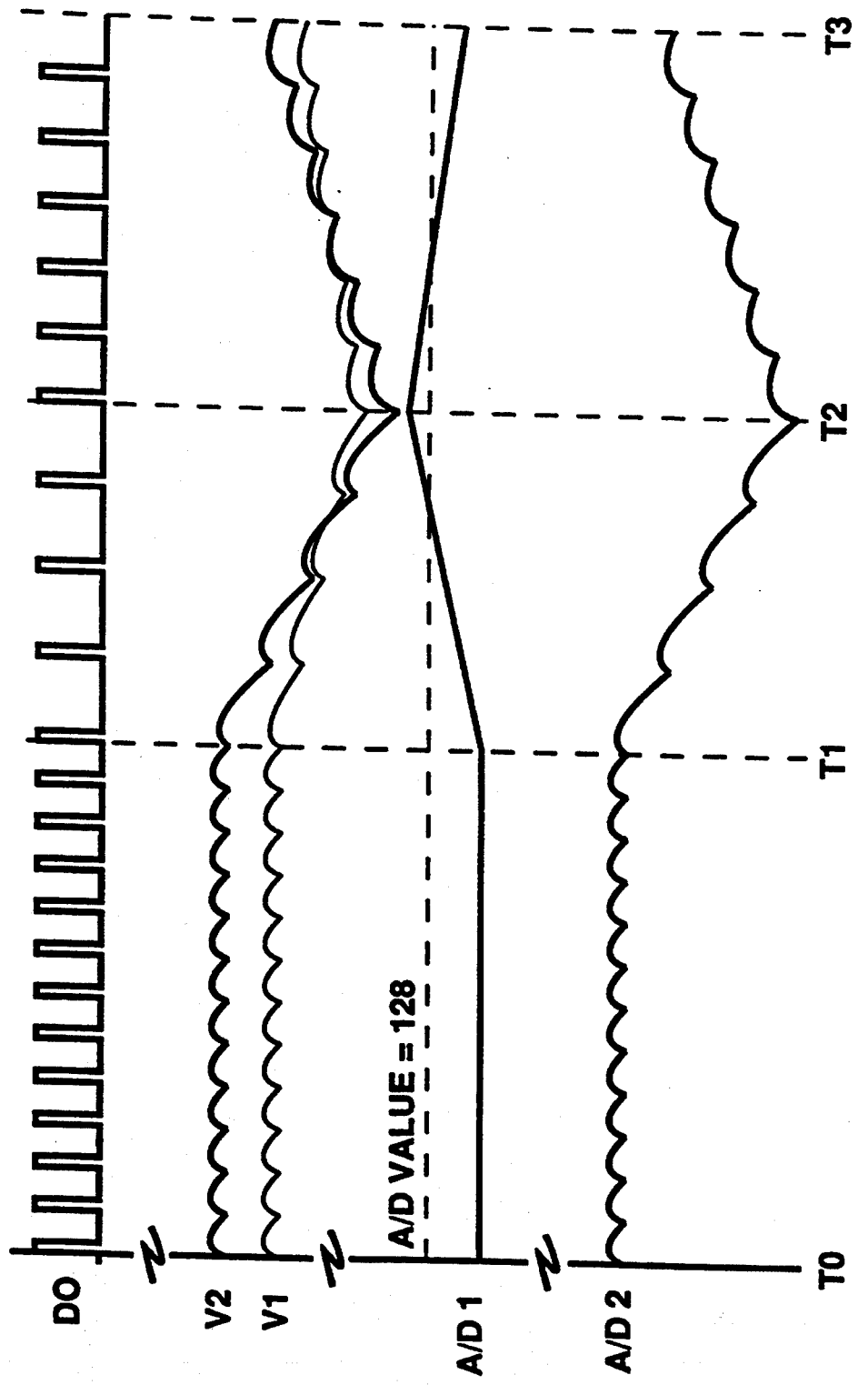
FIGS. 18(a) and 18(b) are primary signal diagrams of the control circuit depicted in FIG. 16 in the first operational mode.
Figure 18B:
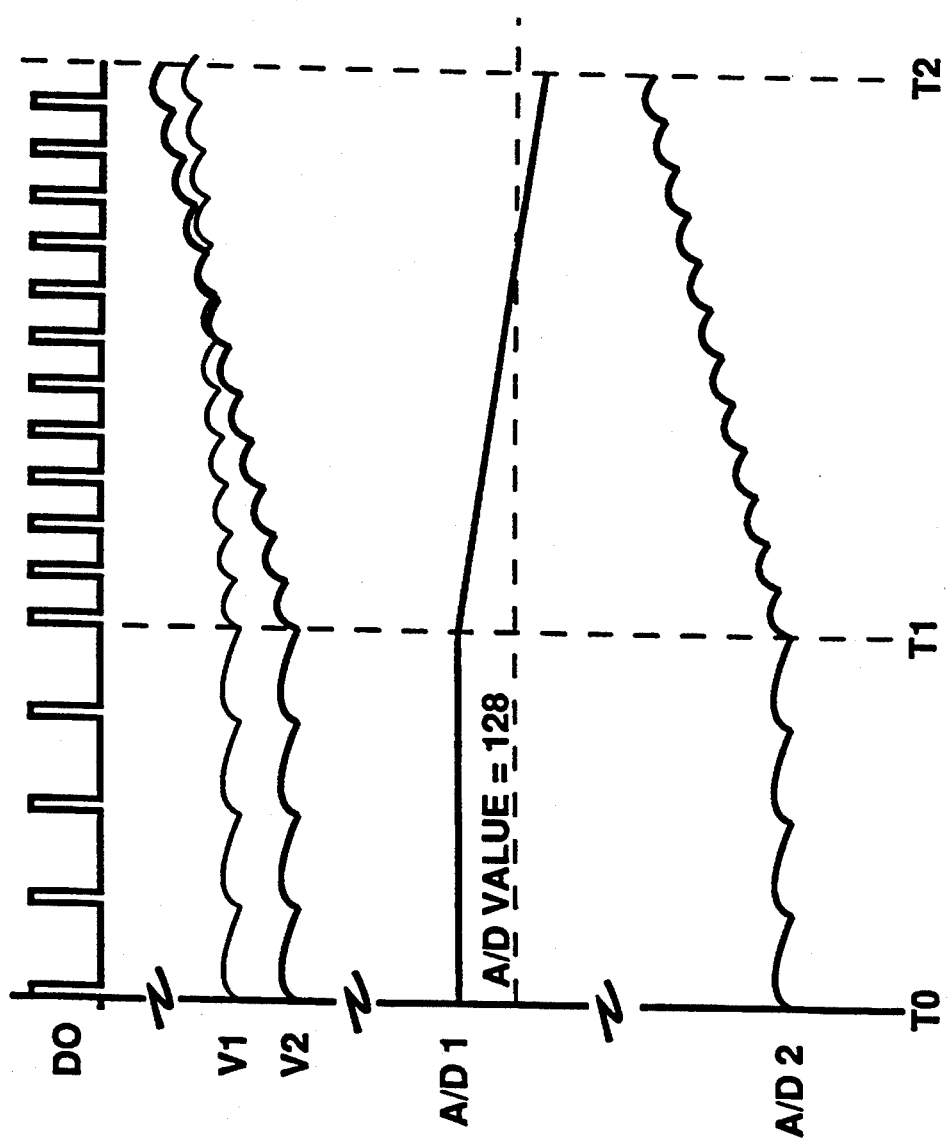
Figure 19:
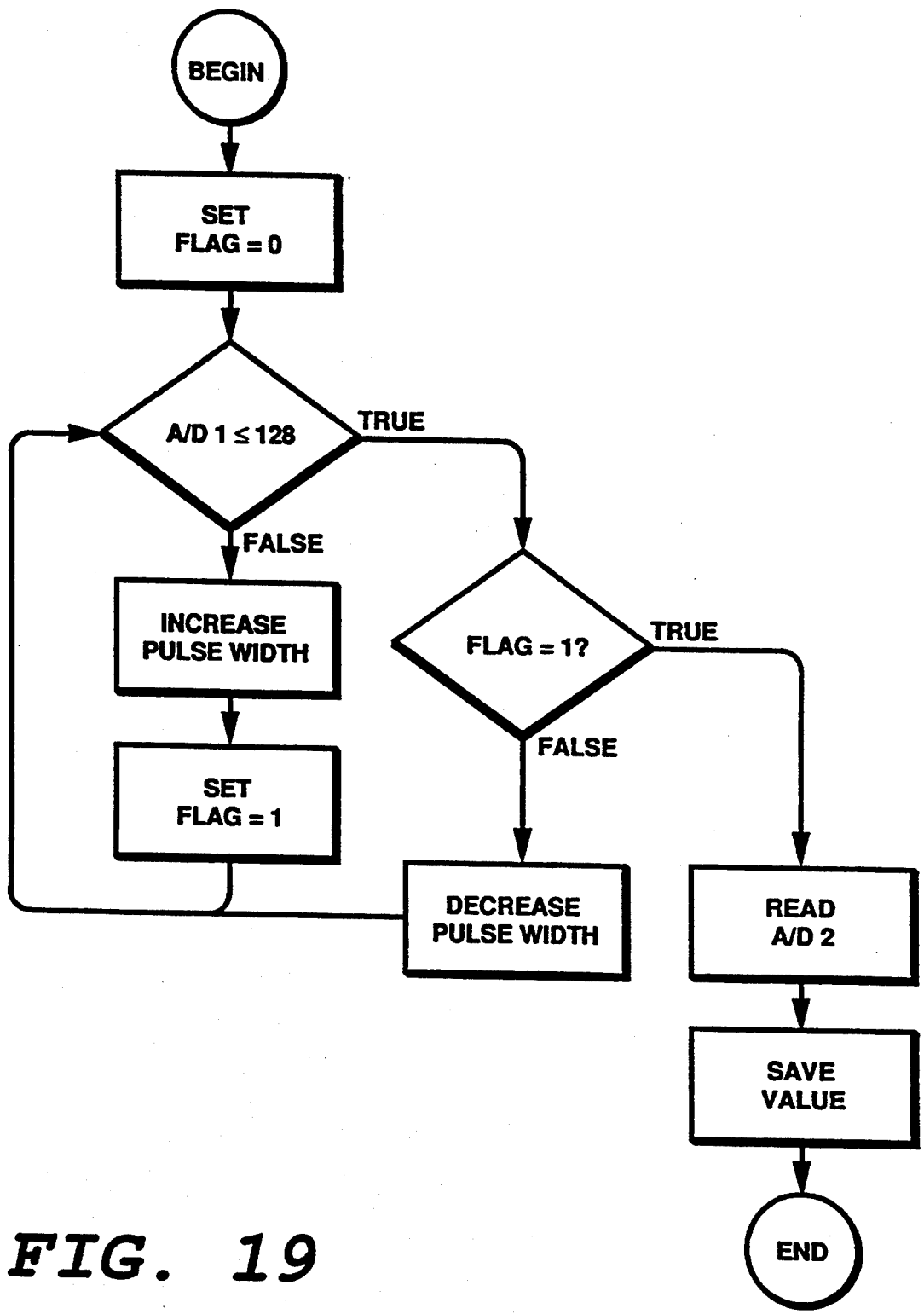
FIG. 19 is a decision flow chart of an air flow measurement algorithm for the control circuit in FIG. 16 when it is operated in a second operational mode.
Figure 20A:
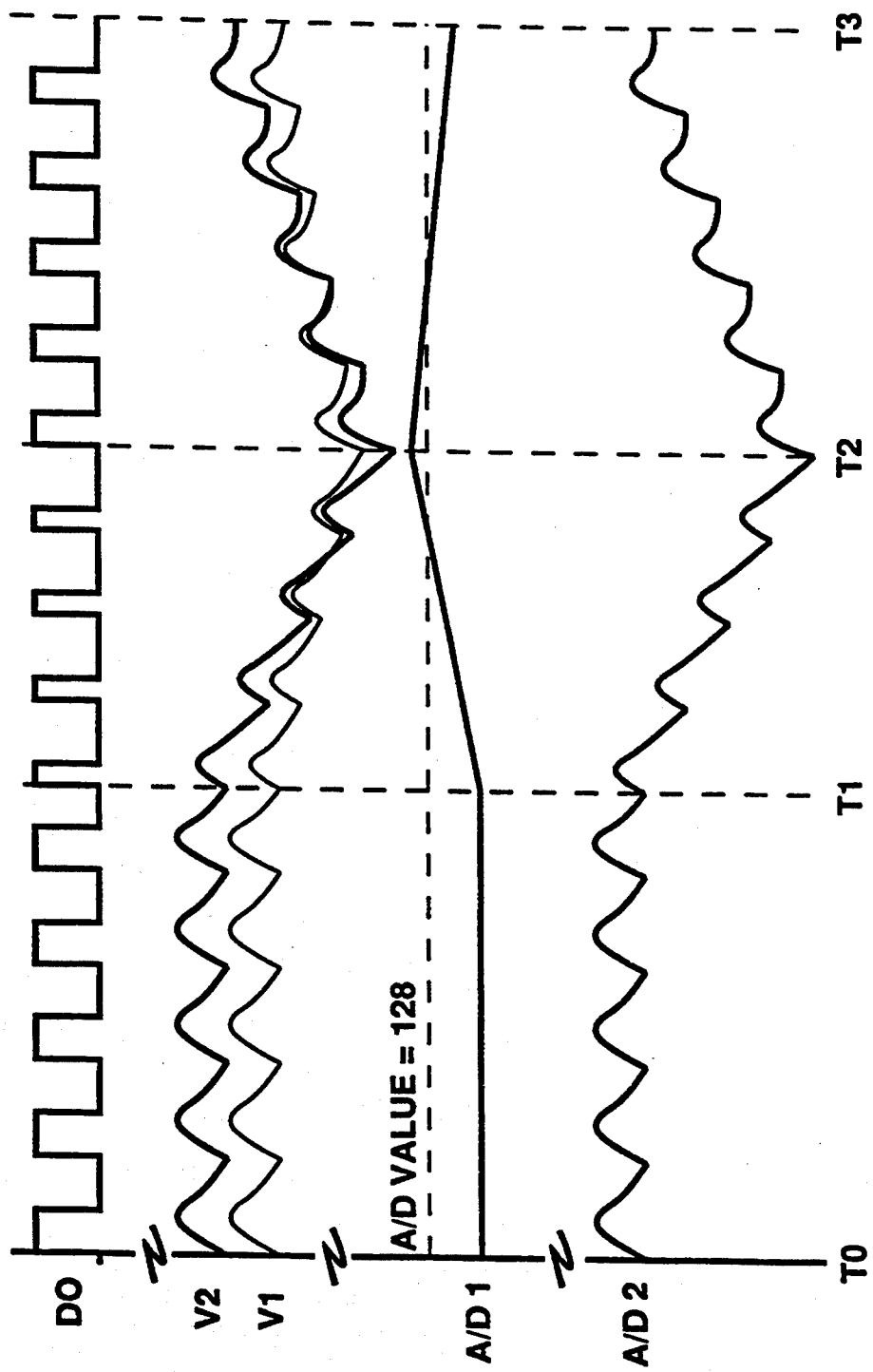
FIGS. 20(a) and 20(b) are primary signal diagrams which depict operation of the control circuit illustrated in FIG. 16 in the second operational mode.
Figure 20B:
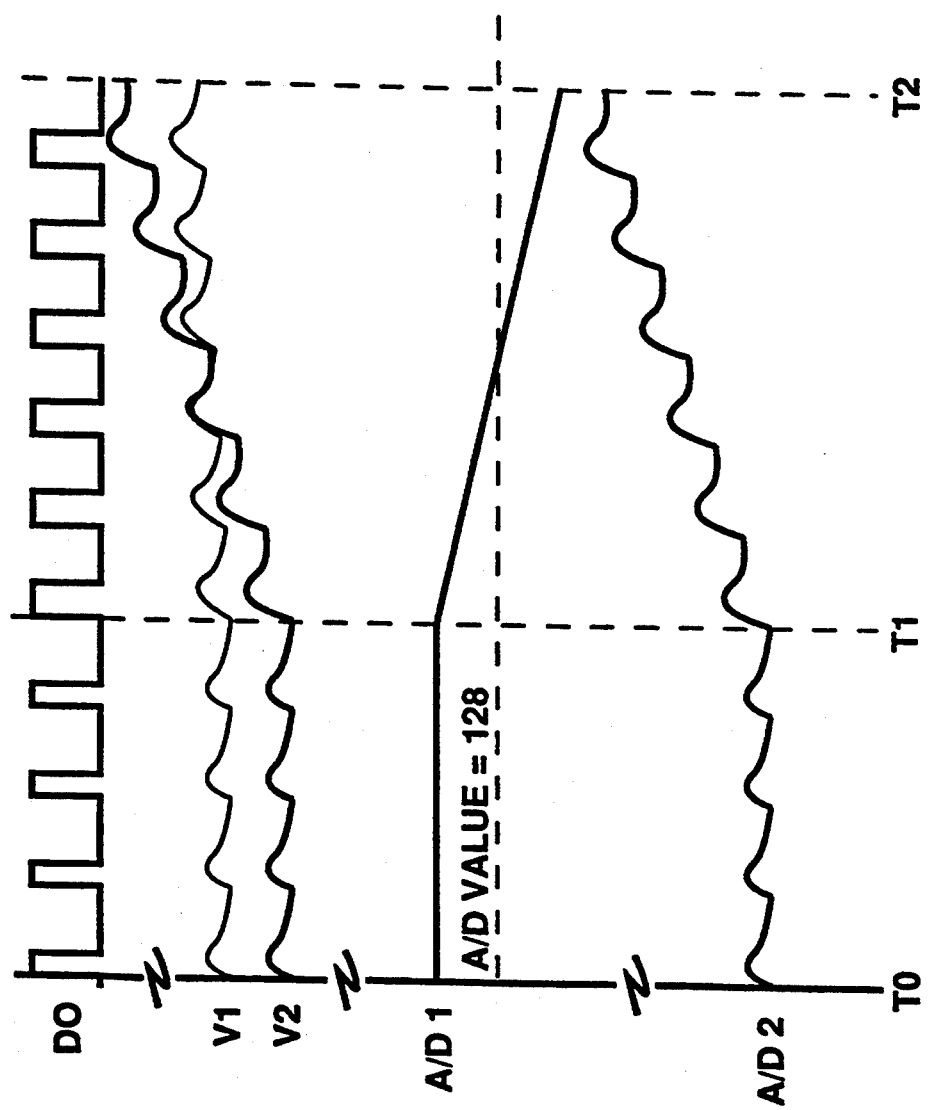

RTDF and RTDA are the air flow sensing resistance thermal device and the ambient temperature sensing resistance thermal device, respectively. R1, R7 and R9 are fixed resistors. As discussed above, the circuit may be operated in a constant pulse/variable period mode or in a constant period/variable pulse width mode. FIGS. 17, 18(a) and 18(b) illustrate operation in constant pulse width/variable period mode. FIGS. 19, 20(a) and 20(b) illustrate operation in constant period/variable pulse width mode. Basic operation of the circuit is the same for both cases, except for the method of modulating the current supplied to RTDF from the V+ supply through transistor Q1.

I. Case 1

In the first case, assume that the circuit has been in operation so that the RTDF is at a temperature that causes its resistance to be greater than (RTDA×R1)/R7. Then, V2 is greater than V1 and the other key signals are in the state shown at T0 in FIGS. 18(a) or 20(a). Further, assume that the microcomputer has initialized its internal flag to "0". At time T1, the microcomputer U2 samples the output of the differential amplifier with the analog-to-digital convertor and recognizes that A/D1 is less than 128. The microcomputer U2 increases the period (or decreases the pulse width) at output D0. The increased period (or decreased pulse width) decreases the average current flowing from V+ through transistor Q1 to RTDF, causing RTDF's temperature and proportionately its resistance to decrease due to heat conduction to the airstream. The decreased average current causes V1, V2 and V3 to decrease. The decrease in RTDF's resistance causes V1 to decrease at a slower rate than the decrease in V2, until V2 is less than V1.

At T2, the microcomputer U2 samples the output of the differential amplifier with the analog-to-digital convertor and recognizes that A/D1 is greater than 128. The microcomputer U2 decreases the period (or increases the pulse width) at output D0, and sets an internal flag to "1". The decreased period (or increased pulse width) increases the average current flowing from V+ through transistor Q1 to RTDF, causing RTDF's temperature and proportionately its resistance to increase due to self-heating. The increased average current causes V1, V2 and V3 to increase. The increase in RTDF's resistance causes V1 to increase at a slower rate than the increase in V2, until V2 is greater than V1.

At T3, the microcomputer U2 samples the output of the differential amplifier with the analog-to-digital convertor and recognizes that A/D1 is less than 128 and determines that the internal flag is set to "1". The microcomputer U2 samples the output of the unity gain, non-inverting voltage amplifier, A/D2, and saves the value of the analog to digital conversion.

II. Case 2

In the second case, assume that the circuit has been in operation so that the RTDF is at a temperature that causes its resistance to be less than (RTDA×R1)/R7. Then, V2 is less than V1 and the other key signals are in the state shown at T0 in FIGS. 18(b) or 20(b). Further, assume that the microcomputer has initialized its internal flag to "0".

At T1, the microcomputer U2 samples the output of the differential amplifier with the analog-to-digital convertor and recognizes that A/D1 is greater than 128. The microcomputer U2 decreases the period (or increases the pulse width) at output DO, and sets an internal flag to "1". The decreased period (or increased pulse width) increases the average current flowing from V+ through transistor Q1 to RTDF, causing RTDF's temperature and proportionately its resistance to increase due to self-heating. The increased average current causes V1, V2 and V3 to increase. The increase in RTDF's resistance causes V1 to increase at a slower rate than the increase in V2, until V2 is greater than V1.

At T2, the microcomputer U2 samples the output of the differential amplifier with the analog-to-digital convertor and recognizes that A/D1 is less than 128 and determines that the internal flag is set to "1". The microcomputer U2 samples the output of the unity gain, non-inverting voltage amplifier, A/D2 and saves the value of the analog-to-digital conversion.

In practice, the sequences of operations described above will be performed several times per second, causing the value of RTDF's temperature and proportionately its resistance to be near a value defined by RTDF=(RTDA×R1)/R7. Note that this equality is identical to the relationship that defines the steady state condition for the alternate circuitry illustrated in FIG. 10.

For properly dimensioned component values, and for proper choices for operating periods and pulse widths, and for proper choices of sampling intervals (i.e., how often the sequence of operation is performed with respect to time) the results from this circuit will duplicate the results of the alternate circuitry illustrated in FIG. 4. That is, the power required to maintain RTDF at the resistance that satisfies the steady state operating condition is equal to the heat transferred to the air stream. The heat transferred to the air stream is proportional to the product of the temperature difference between RTDF and RTDA and the square root of air flow velocity. The current through RTDF is equal to the square root of the ratio of the power dissipated by RTDF to the resistance of RTDF. R1, R7, RTDA and RTDF are dimensioned so that the resistance of RTDF increases or decreases proportionately with the temperature difference between RTDF and RTDA, maintaining the current through RTDF independent of the ambient air temperature at the steady state operating condition. Thus, the current through RTDF is proportional to the fourth root of the air flow velocity. Further, with R1 and R7 dimensioned so that they have significantly greater resistance with respect to RTDF and RTDA, the current through R9 will be nearly equal to the current through RTDF. The average voltage drop across R9, V3 is equal to the product of the average current through R9 and the resistance of R9. Thus, the value of V3 sampled by the analog-to-digital convertor at input A/D2 and saved by microcomputer U2 is proportional to the current through RTDF with negligible error and is therefore proportional to the fourth root of the air flow velocity with negligible error.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A sensor for measuring flow of a fluid in a channel comprising:
    a heater;
    a thermal collector connected to said heater for distributing heat to a plurality of radiator elements;
    each of said radiator elements having a first end and having a second end, each of said first ends connected to said thermal collector, each of said first ends connected to said thermal collector, each of said ends exposed to said flow of said fluid;
    means for measuring the power supplied to said heater, and for generating a power measurement;
    a first temperature measuring device thermally coupled to said thermal collector for measuring the temperature of said thermal collector generating a thermal conductor temperature measurement;
    a second temperature measuring device thermally coupled to said fluid and thermally isolated from said thermal conductor for generating a fluid temperature measurement;
    computation means for computing the flow of said fluid from said thermal collector temperature measurement and said fluid temperature measurement and said power measurement.

* * * * *